US010896076B2

(12) United States Patent
Sato

(10) Patent No.: US 10,896,076 B2
(45) Date of Patent: Jan. 19, 2021

(54) INFORMATION PROCESSING SYSTEM AND CONTROL METHOD FOR EXECUTING A PROCESS BASED ON A MESSAGE ACQUIRED FROM A QUEUE

(71) Applicant: CANON KABUSHIKI KAISHA, Tokyo (JP)

(72) Inventor: Tetsuya Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 244 days.

(21) Appl. No.: 15/866,292

(22) Filed: Jan. 9, 2018

(65) Prior Publication Data

US 2018/0210771 A1 Jul. 26, 2018

(30) Foreign Application Priority Data

Jan. 24, 2017 (JP) ................. 2017-010747

(51) Int. Cl.
*G06F 9/455* (2018.01)
*G06F 9/54* (2006.01)
(Continued)

(52) U.S. Cl.
CPC ........... *G06F 9/546* (2013.01); *G06F 9/48* (2013.01); *G06F 9/45558* (2013.01); *G06F 9/5077* (2013.01); *G06F 2209/548* (2013.01)

(58) Field of Classification Search
CPC ........ G06F 9/546; G06F 9/45558; G06F 9/48; G06F 9/5077; G06F 2209/548
See application file for complete search history.

(56) References Cited

U.S. PATENT DOCUMENTS 8,612,971 B1* 12/2013 Fitzgerald ........... G06F 9/45533
718/1
8,799,896 B2* 8/2014 Shigeta ............... G06F 11/2247
709/217

(Continued)

FOREIGN PATENT DOCUMENTS

JP 2009-129376 A 6/2009
JP 2012-88770 A 5/2012

(Continued)

OTHER PUBLICATIONS

Ramya et al. "Detecting and Diagnosing Application Misbehaviors in 'On-Demand' Virtual Computing Infrastructures", 2011 IEEE, pp. 198-203.*

(Continued)

*Primary Examiner* — Van H Nguyen
(74) *Attorney, Agent, or Firm* — Canon U.S.A., Inc. IP Division

(57) ABSTRACT

An information processing system includes a management server managing one or more virtual machines in which a plurality of applications operate, the management server changes, in a case where an abnormality is detected in any of the applications operating in a virtual machine, a first setting managed by the information processing system to a second setting for stopping acquisition of a message by each of the applications, and the each application completes a process based on a message having been acquired before the change of the setting, and stops acquiring another message according to the second setting.

9 Claims, 17 Drawing Sheets

(51) Int. Cl.
*G06F 9/48* (2006.01)
*G06F 9/50* (2006.01)

(56) References Cited

U.S. PATENT DOCUMENTS

| | | | | |
|---|---|---|---|---|
| 9,183,093 | B2* | 11/2015 | Antony | G06F 11/1448 |
| 9,262,240 | B2* | 2/2016 | Minematsu | G06F 9/544 |
| 9,529,997 | B2* | 12/2016 | Birnbaum | G06F 21/53 |
| 10,048,978 | B2* | 8/2018 | Iyobe | G06F 9/45558 |
| 10,191,760 | B2* | 1/2019 | Kitano | G06F 9/45558 |
| 10,437,621 | B2* | 10/2019 | Haque | G06F 9/45558 |
| 2007/0101323 | A1* | 5/2007 | Foley | G06F 9/45537 |
| | | | | 718/1 |
| 2010/0100881 | A1* | 4/2010 | Shigeta | G06F 8/63 |
| | | | | 718/1 |
| 2016/0314010 | A1* | 10/2016 | Haque | G06F 9/45558 |

FOREIGN PATENT DOCUMENTS

| | | |
|---|---|---|
| JP | 2015-57685 A | 3/2015 |
| JP | 2017-4050 A | 1/2017 |

OTHER PUBLICATIONS

Kim et al. "Monitoring and Detecting Abnormal Behavior in Mobile Cloud Infrastructure", 2012 IEEE, pp. 1303-1310.*

* cited by examiner

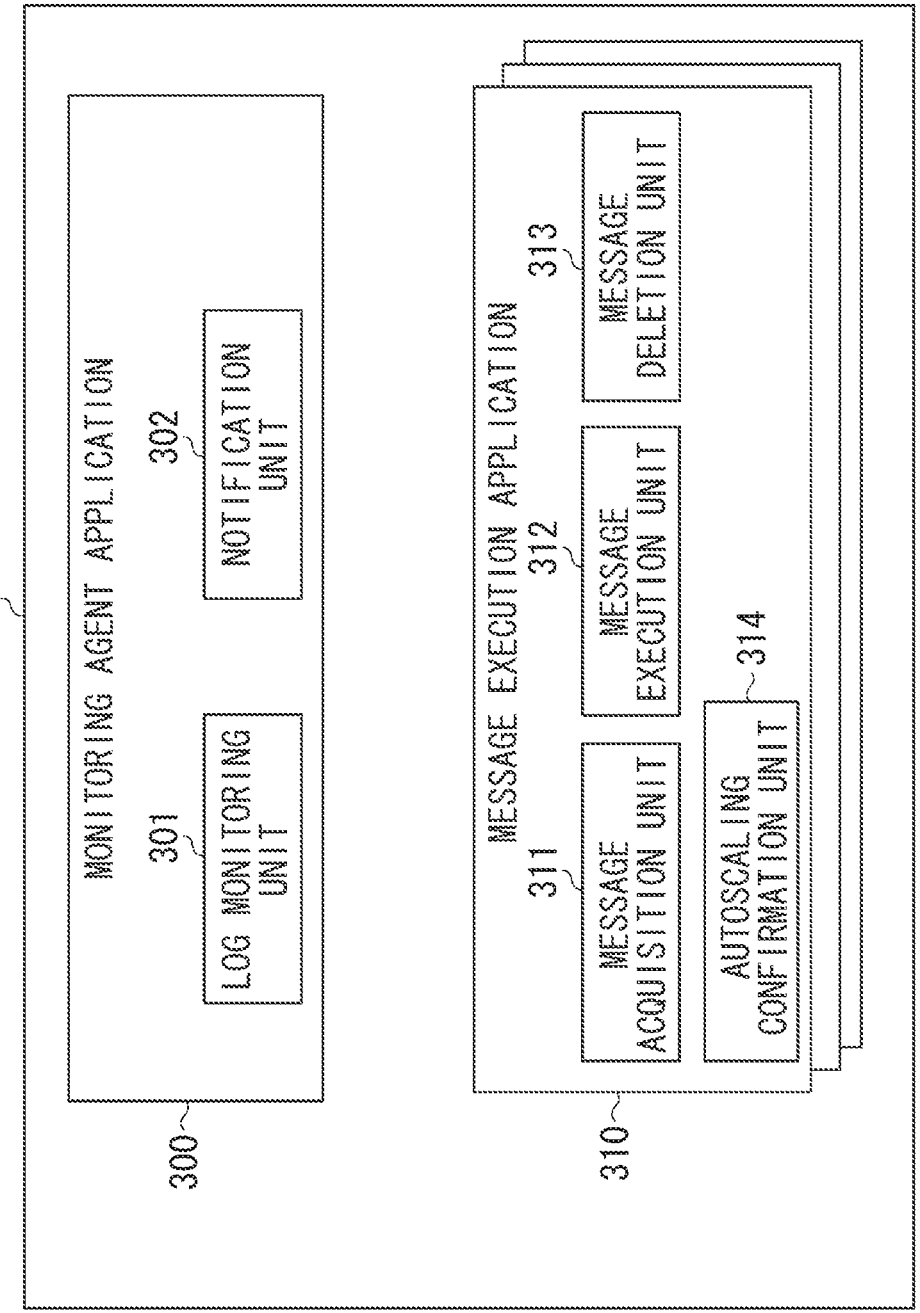

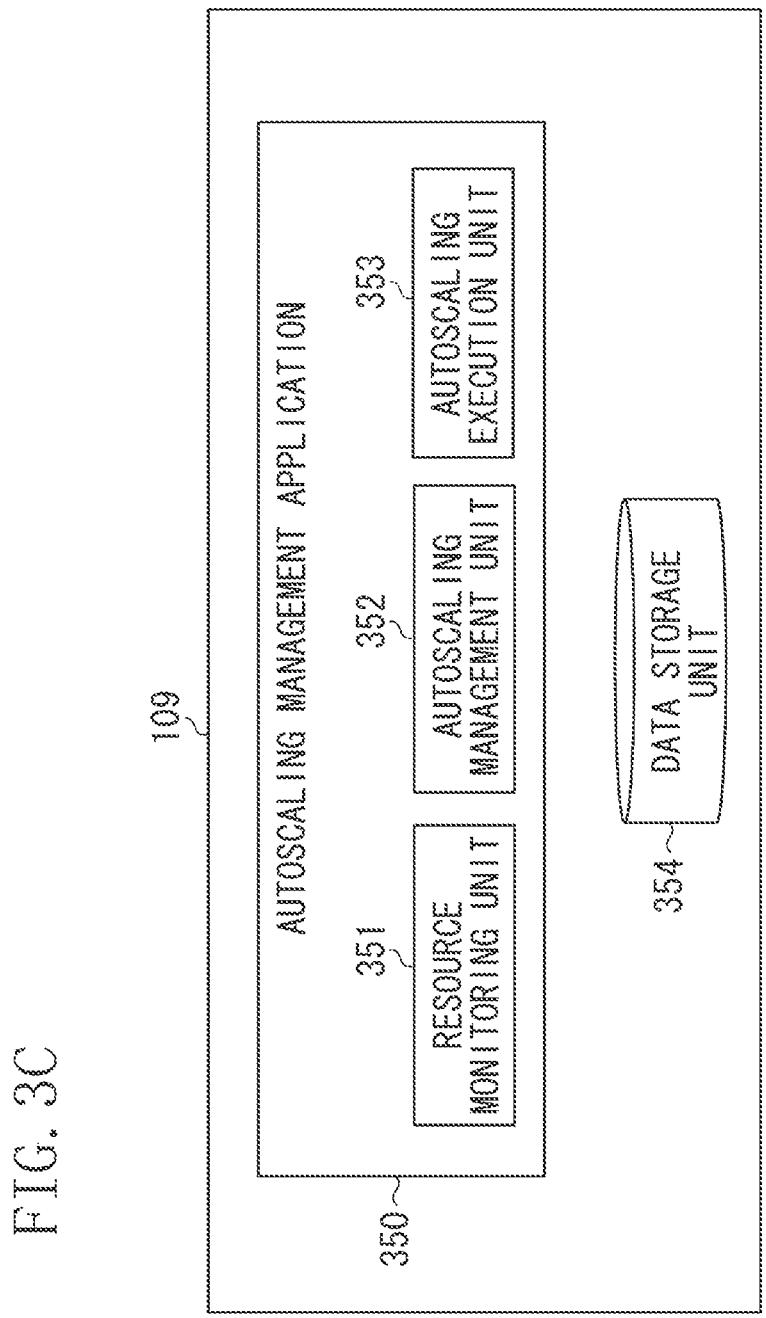

FIG. 5

```
501 ~ : : :
502 ~ 2016-10-26 10:00:24.113 INFO Queue polling...
503 ~ 2016-10-26 10:00:29.312 INFO Queue polling...
504 ~ 2016-10-26 10:00:30.713 INFO DataAggregate [Enter] messageId=1000003
505 ~ : : :
      2016-10-26 10:00:50.316 INFO DataAggregate [Leave]
      : : :
```

500

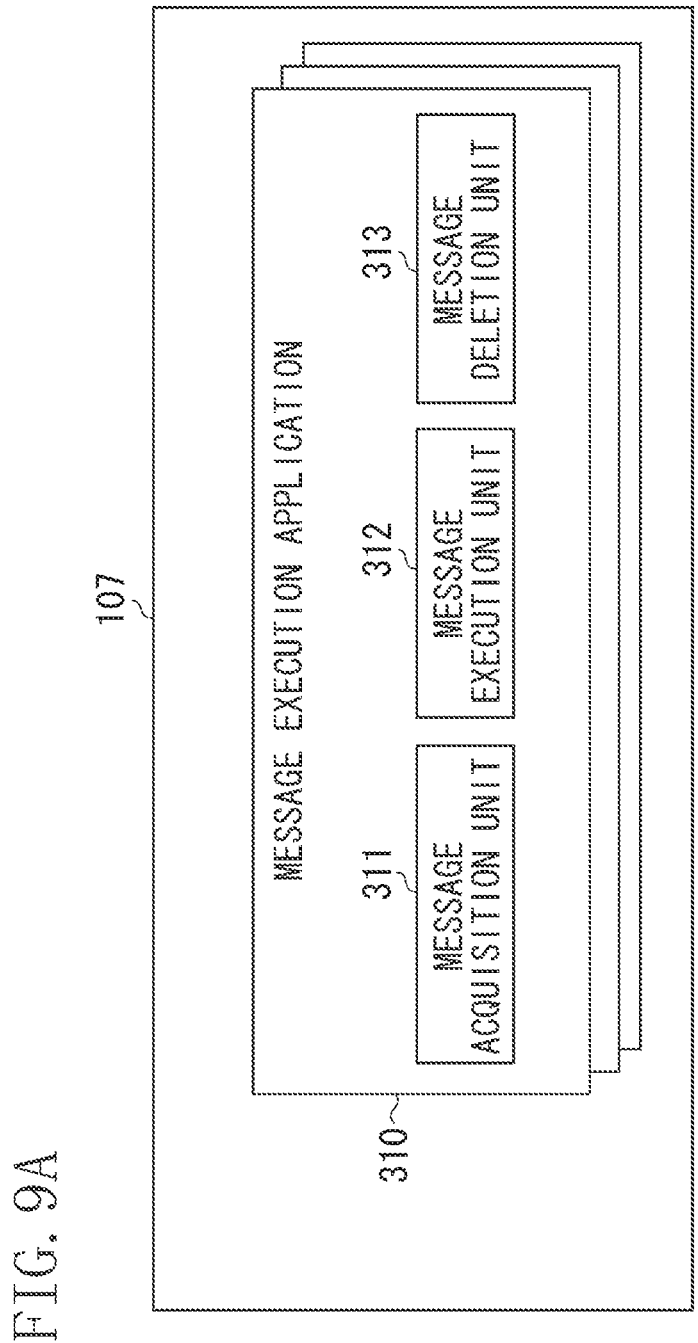

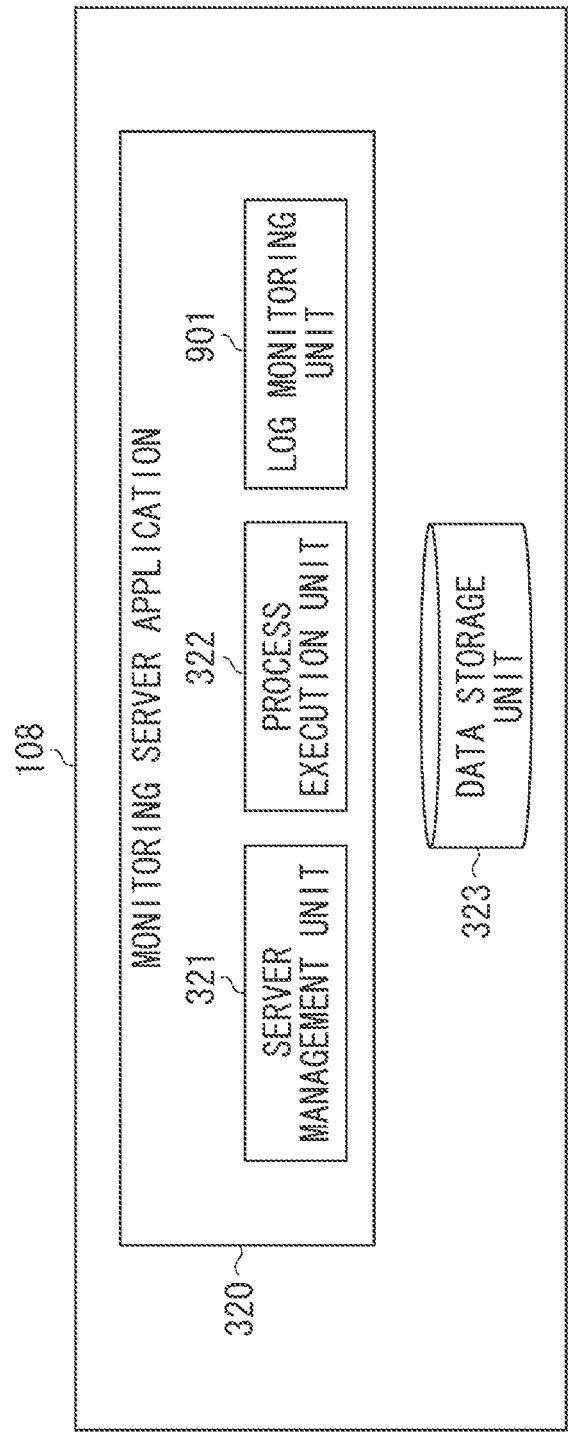

INFORMATION PROCESSING SYSTEM AND CONTROL METHOD FOR EXECUTING A PROCESS BASED ON A MESSAGE ACQUIRED FROM A QUEUE

BACKGROUND OF THE INVENTION

Field of the Invention

The present disclosure relates to an information processing system for executing a process based on a message acquired from a queue, and a control method.

Description of the Related Art

In recent years, as a service that allows the use of various applications operating on a server present on the Internet, there is a cloud service. In a cloud service such as Infrastructure as a service (IaaS) or Platform as a service (PaaS), a cloud service vendor provides resources such as virtual machines and storage for a system administrator via a network. The virtual machines are a logical computer achieved as follows by virtualization technology. A server is divided into logical units, regardless of the physical configuration of the server, and the logical computer operates with the divided logical units having independent operating systems. The system administrator can construct a system for providing a unique service, using the resources such as the virtual machines and the storage provided by the cloud service vendor.

In the system constructed using the cloud service, a message queue (hereinafter referred to as a "queue") may be used to process data in parallel. In the queue, a message corresponding to the data to be processed is stored. A virtual machine having the function of processing the message acquires the message stored in the queue, and according to a processing content described in the message, executes processing. A plurality of virtual machines thus process messages acquired from the queue, whereby it is possible to process data in parallel.

To operate the above system, when an abnormality occurs in a virtual machine, the virtual machine is to be deleted to avoid influencing the operation of the system. In an execution system discussed in the publication of Japanese Patent Application Laid-Open No. 2015-57685, a job execution server sequentially processes a plurality of processes corresponding to a single job execution command. Even after a certain time elapses since a process execution unit in the job execution server starts processing the processes, and if there is no response indicating the completion of the processing, the job execution server determines that the processing of the processes is abnormal. Then, the job execution server ends the processing performed by the process execution unit. After that, the process execution server disappears.

In the above system using the queue, at least one application for acquiring a message from the queue and executing processing based on the message is placed in a virtual machine. At this time, when in a virtual machine in which a plurality of applications are placed, an abnormality occurs in one of the applications, and even if this application is stopped, the other applications further acquire messages. As a result, while the other applications are processing the acquired messages, the virtual machine cannot be deleted. If the virtual machine is deleted while the other applications are processing the messages, the processing based on the messages may be suspended. This may influence the system.

SUMMARY OF THE INVENTION

According to an aspect of the embodiments, an information processing system includes a memory for storing instructions related to a management server managing one or more virtual machines in which a plurality of applications operate, wherein the applications acquire messages from a message storage area based on a first setting managed for each virtual machine by the information processing system; and a processor for executing the instructions causing a computer in the information processing system to change, in a case where an abnormality is detected in any of the applications, the first setting to a second setting for stopping acquisition of a message by each of the applications, and wherein the each application operating in the virtual machine completes a process based on a message having been acquired before the change of the setting, and stops acquiring another message according to the second setting.

Further features of the disclosure will become apparent from the following description of exemplary embodiments with reference to the attached drawings.

BRIEF DESCRIPTION OF THE DRAWINGS

FIGS. 3A, 3B, and 3C are diagrams illustrating examples of functional configurations of servers according to the exemplary embodiment of the disclosure.

FIG. 5 is a diagram illustrating an example of a log file of a message execution application.

FIGS. 9A and 9B are diagrams illustrating examples of functional configurations of servers according to the second exemplary embodiment.

DESCRIPTION OF THE EMBODIMENTS

Exemplary embodiments for carrying out the disclosure will be described below with reference to the drawings.

<System Configuration>

Figure 1:
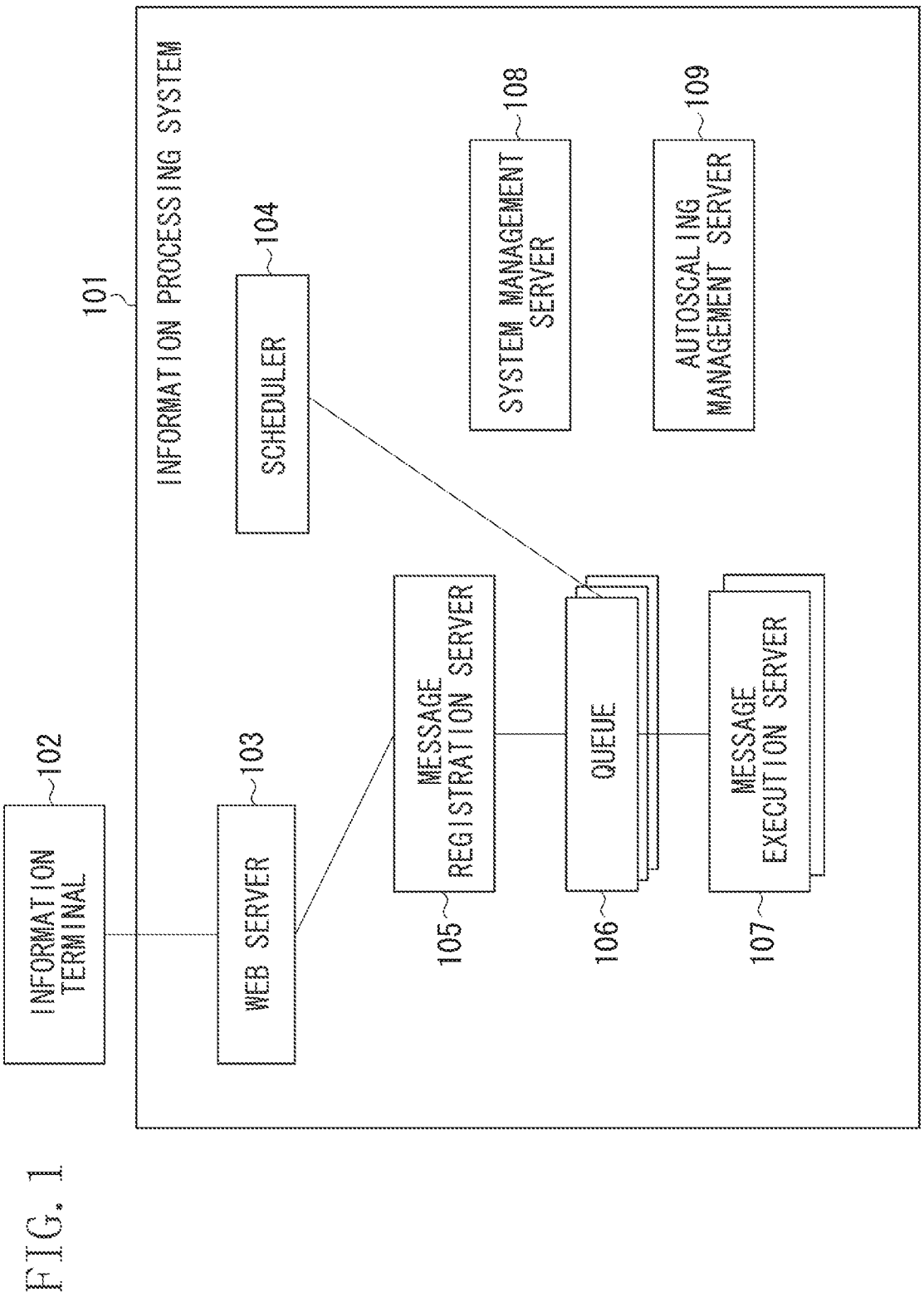
FIG. 1 is a schematic diagram illustrating an overall configuration of a system according to an exemplary embodiment of the disclosure.

A first exemplary embodiment is described below. FIG. 1 is a schematic diagram illustrating the overall configuration of a system according to the exemplary embodiment of the disclosure.

In FIG. 1, an information processing system 101 is constructed using resources such as virtual machines and storage provided by a cloud service vendor. The virtual machines are a logical computer achieved as follows by virtualization technology. A server is divided into logical units, regardless of the physical configuration of the server, and the logical computer operates with the divided logical units having independent operating systems. The information processing system 101 includes a web server 103, a scheduler 104, a message registration server 105, queues 106, and message execution servers 107. Further, the information processing system 101 includes a system management server 108 and an autoscaling management server 109.

An information terminal 102 is a personal computer (PC) and is a terminal used by a user who uses a service provided by the information processing system 101. Through a web page provided by the information processing system 101, the user instructs the information processing system 101 to execute a process.

The web server 103 is one or more virtual machines for providing a web page on which the user uses a service. The web server 103 receives an instruction to execute a process from the user through the web page. Then, the web server 103 transmits to the message registration server 105 a request to register a message for executing the process that the web server 103 is instructed to execute.

The scheduler 104 gives an instruction to execute a periodic process. The periodic process is a periodic aggregation process for data managed in the information processing system 101. If the execution time of a periodic process set in advance arrives, the scheduler 104 transmits to one of the queues 106 a message for executing the periodic process.

The message registration server 105 is one or more virtual machines for creating a message and registering the message in one of the queues 106. If receiving from the web server 103 a request to register a message, the message registration server 105 creates a message and registers the generated message in one of the queues 106.

Each queue 106 is a storage area for storing a message registered by the message registration server 105. When a message is registered in the queue 106, the queue 106 makes the message invisible until the delay time of the message elapses. Further, when a message is acquired from the queue 106, the queue 106 makes the message invisible until the invisibility time of the message elapses.

Each message execution server 107 is one or more virtual machines for acquiring a message registered in one of the queues 106 and executing a process that the message execution server 107 is instructed to execute by the message. In the message execution server 107, a plurality of message execution applications 310 are placed. At this time, the message execution servers 107 are autoscaling targets in the autoscaling management server 109 and are configured to increase or decrease the number of the message execution servers 107 according to the usage rate of a CPU or the number of messages stored in the queues 106.

At this time, in the present exemplary embodiment, the queues 106 are prepared with respect to the types of processes to be executed by the information processing system 101. For example, a queue 106 for registering a message for executing an aggregation process for aggregating data and a queue 106 for registering a message for transmitting email are different queues. Alternatively, the configuration may be such that a single queue is used by grouping messages into appropriate units with respect to the types of processes.

According to the state of the information processing system 101, the system management server 108 executes various processes such as the process of giving an email notification to a system administrator and the process of deleting a virtual machine. Further, based on an instruction from the system administrator, the system management server 108 maintains the information processing system 101.

The autoscaling management server 109 manages the number of virtual machines as autoscaling targets in the information processing system 101. "Autoscaling" refers to the function of, according to the processing loads of virtual machines, automatically adjusting the number of the virtual machines and the assignment of a CPU to the virtual machines. If a condition set by the system administrator is satisfied, the autoscaling management server 109 increases or decreases the number of virtual machines as autoscaling targets. For example, according to the number of requests received by a load balancer (not illustrated) for transferring a request to the web server 103, the autoscaling management server 109 adjusts the number of virtual machines for the web server 103. The autoscaling management server 109 similarly adjusts the number of virtual machines for the message registration server 105. Further, according to the usage rate of a CPU and the number of messages stored in the queues 106, the autoscaling management server 109 adjusts the number of virtual machines for the message execution servers 107. Further, the autoscaling management server 109 manages the minimum number of operating virtual machines as autoscaling targets. If a virtual machine is deleted, the autoscaling management server 109 starts a new virtual machine to maintain the minimum number of operating virtual machines.

At this time, if an abnormality occurs in the web server 103, the web server 103 is excluded from autoscaling targets, whereby the load balancer (not illustrated) does not transfer a request to the web server 103. As a result, the web server 103 does not receive a request. Thus, it is possible to delete the web server 103 or investigate the cause of the abnormality having occurred in the web server 103. If, on the other hand, an abnormality occurs in any of the message execution servers 107, and even if the message execution server 107 is excluded from autoscaling targets, the message execution server 107 acquires a message from one of the queues 106 and performs a process. Thus, in one embodiment, it may be necessary to devise a way to delete the message execution server 107 or investigate the cause of the abnormality having occurred in the message execution server 107.

The components illustrated in FIG. 1 from the information terminal 102 to the autoscaling management server 109 are connected to each other by a known technique such as the Internet so that the components can communicate with each other.

<Internal Configuration of Information Processing Apparatus>

Figure 2:
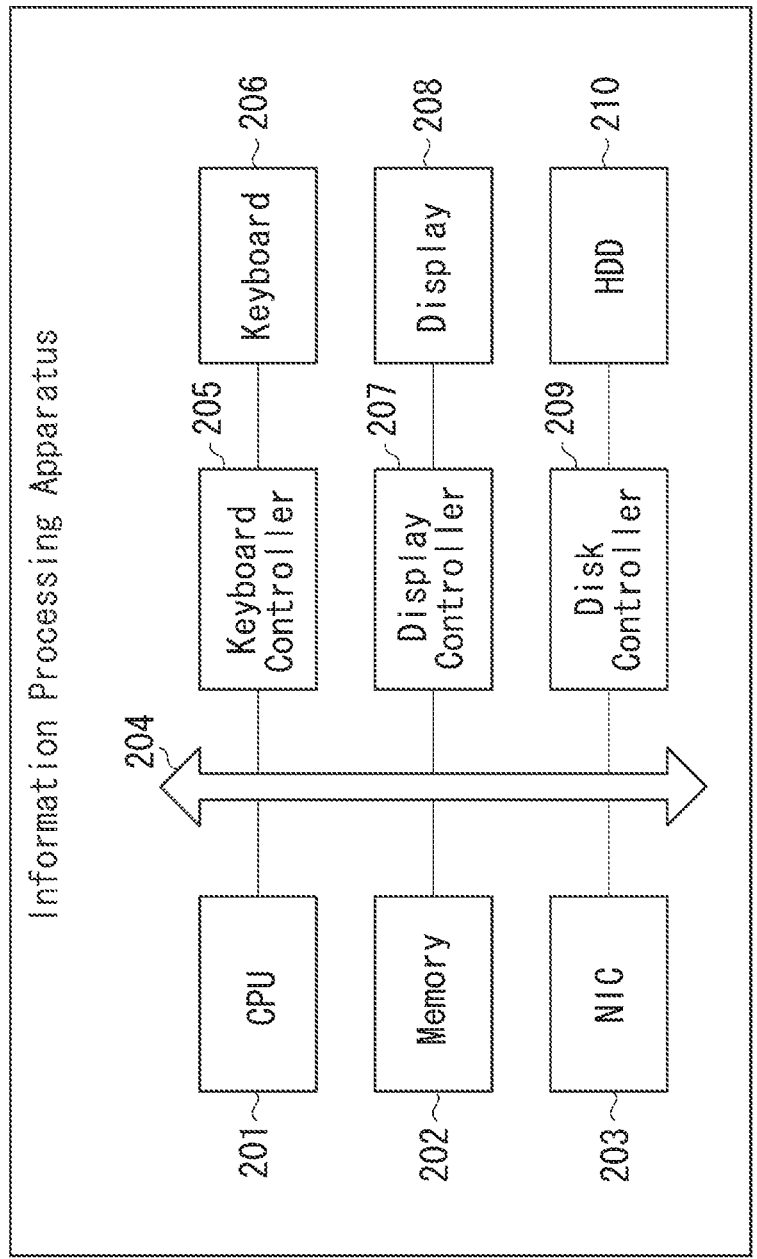
FIG. 2 is a diagram illustrating an example of an internal configuration of an information processing apparatus.

FIG. 2 is a diagram illustrating an example of the internal configuration of an information processing apparatus. The information processing apparatus according to the present exemplary embodiment corresponds to the information terminal 102 or a server computer on which a virtual machine functioning as each component in the information processing system 101 operates.

The information processing apparatus includes a central processing unit (CPU) 201, which executes software stored in a hard disk drive (HDD) 210, which is a storage device. The CPU 201 performs overall control of pieces of hardware connected to a system bus 204.

A memory 202 functions as a main memory or a work area for the CPU 201. A network interface card (NIC) 203 exchanges data to and from another node in a two-way manner via a network.

A keyboard controller 205 controls an instruction input from a keyboard 206, which is included in the PC. The configuration may be such that the keyboard controller 205 and the keyboard 206 are not included depending on the function of the information processing apparatus.

A display controller 207 controls the display of a display module 208, which includes a liquid crystal display, for example. The configuration may be such that the display controller 207 and the display module 208 are not included depending on the function of the information processing apparatus. A disk controller 209 controls an HDD 210, which is a large-capacity storage device.

<Functional Configuration of Message Execution Server>

FIG. 3A is a diagram illustrating an example of the functional configuration of each message execution server 107. On the message execution server 107, a monitoring agent application 300 and a plurality of message execution applications 310 operate. The plurality of message execution applications 310 process respectively different types of messages. The plurality of message execution applications 310 acquire messages from different queues 106 and execute the messages. For example, one of the message execution applications 310 performs an aggregation process for aggregating data, and another one of the message execution applications 310 transmits email. The functions of these applications are achieved by, in the server computer in which the message execution server 107 is constructed, the CPU 201 loading a program stored in the HDD 210 into the memory 202 and executing the program.

At this time, a case is considered where a single message execution application 310 is placed in the message execution server 107. When an abnormality occurs in the message execution application 310, and if the application is stopped, a virtual machine in which the application is placed does not further acquire a message. Thus, the virtual machine can be deleted. On the other hand, a case is considered where a plurality of message execution applications 310 are placed in the message execution server 107. When abnormalities occur in some of the message execution applications 310, and even if only the applications in which the abnormalities have occurred are stopped, the other applications acquire messages. Thus, while the other applications are processing the messages, a virtual machine in which the applications are placed cannot be deleted without influencing the information processing system 101. In response, to resolve this situation, a mechanism for, when an abnormality is detected in a virtual machine in which a plurality of applications are placed, preventing all the plurality of applications from further acquiring messages will be described below with reference to FIGS. 4, 6, and 7.

The monitoring agent application 300 includes a log monitoring unit 301 and a notification unit 302. The log monitoring unit 301 is a module for acquiring a log monitoring condition from table B (to be described below) in the system management server 108 and monitoring a log to determine whether the log satisfies the log monitoring condition. That is, the log monitoring unit 301 monitors the presence or absence of an abnormality in each message execution application 310. The notification unit 302 is a module for, according to a request from the log monitoring unit 301, giving a notification to the system management server 108.

Each message execution application 310 includes a message acquisition unit 311, a message execution unit 312, a message deletion unit 313, and an autoscaling confirmation unit 314. The message acquisition unit 311 is a module for acquiring a message registered in one of the queues 106. The message execution unit 312 is a module for, after the message is acquired, executing a process that the message execution unit 312 is instructed to execute by the message. The message deletion unit 313 is a module for, after the process of the message is executed, deleting from one of the queues 106 the message of which the process is executed. The autoscaling confirmation unit 314 is a module for confirming whether the message execution server 107 on which the message execution application 310 operates is associated with an autoscaling setting. The details of a message execution process will be described below with reference to FIG. 4.

<Functional Configuration of System Management Server>

Figure 3B:
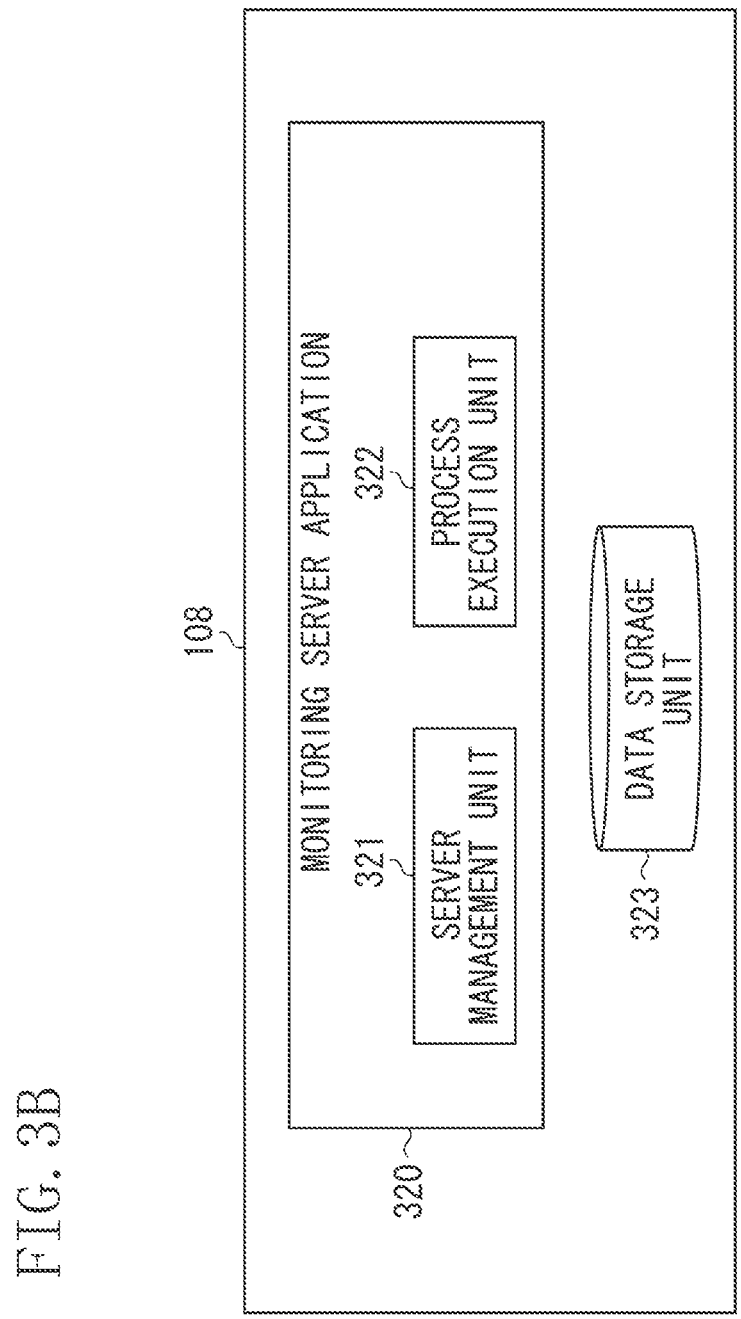

FIG. 3B is a diagram illustrating an example of the functional configuration of the system management server 108. On the system management server 108, a monitoring server application 320 operates. The function of the monitoring server application 320 is achieved by, in the server computer in which the system management server 108 is constructed, the CPU 201 loading a program stored in the HDD 210 into the memory 202 and executing the program.

The monitoring server application 320 includes a server management unit 321 and a process execution unit 322. The server management unit 321 is a module for managing whether each message execution server 107 normally operates. If an abnormality occurs in any of the message execution servers 107, the server management unit 321 instructs the process execution unit 322 to perform the process of removing, from autoscaling targets, the message execution server 107 in which the abnormality has occurred. The process execution unit 322 is a module for performing various processes such as the process of receiving an instruction from the server management unit 321 and requesting the autoscaling management server 109 to remove, from autoscaling targets, the message execution server 107 in which the abnormality has occurred. A data storage unit 323 is a module for managing tables described below with reference to tables A to D.

<Functional Configuration of Autoscaling Management Server>

FIG. 3C is a diagram illustrating an example of the functional configuration of the autoscaling management server 109. On the autoscaling management server 109, an autoscaling management application 350 operates. The function of the autoscaling management application 350 is achieved by, in the server computer in which the autoscaling management server 109 is constructed, the CPU 201 loading a program stored in the HDD 210 into the memory 202 and executing the program.

The autoscaling management application 350 includes a resource monitoring unit 351, an autoscaling management unit 352, and an autoscaling execution unit 353. The resource monitoring unit 351 is a module for monitoring the state of each server as an autoscaling target. Based on a resource monitoring condition described below with reference to table E, the resource monitoring unit 351 monitors each server. If the resource monitoring condition is satisfied, the resource monitoring unit 351 notifies the autoscaling management unit 352 that the resource monitoring condition is satisfied. The autoscaling management unit 352 is a module for managing an autoscaling target.

Based on an autoscaling setting described below with reference to table F, the autoscaling management unit 352 manages the number of servers as autoscaling targets. If a server as an autoscaling target goes down, the autoscaling management unit 352 instructs the autoscaling execution unit 353 to start a new server to maintain the number of servers associated with autoscaling settings. The autoscaling execution unit 353 is a module for receiving an instruction from the autoscaling management unit 352 and starting or deleting a server. The data storage unit 354 is a module for managing tables described below with reference to tables E and F.

<Tables Managed by System Management Server>

Tables A to D are examples of the tables managed by the system management server 108 and are saved in the data storage unit 323 of the system management server 108.

TABLE A

| Scaling ID | Server ID | Application Name | Log State |
|---|---|---|---|
| A001 | S001 | Data aggregation | Stopped |
| A001 | S001 | Email transmission | Normal |
| A001 | S001 | File export | Normal |
| A001 | S002 | Data aggregation | Normal |
| A001 | S002 | Email transmission | Normal |
| ... | ... | ... | ... |

Table A is a server management table. This table includes a column storing a scaling identification (ID) for uniquely identifying an autoscaling setting described below with reference to table F. This table includes a column storing a server ID for uniquely identifying each message execution server 107. This table includes a column storing the application name of an application operating on the message execution server 107 identified by the server ID. Examples of the process of the application include a data aggregation process, an email transmission process, and a file export process. This table includes a column storing a log state, which indicates the output state of a log of the application. Based on the server management table, it is understood whether a log of an application in a message execution server 107 associated with each autoscaling setting is normally output or stopped.

TABLE B

| Agent ID | Application Name | Log File Path | Reference Time |
|---|---|---|---|
| M001 | Data aggregation | /logs/dataAggregate.log | 15 min. |
| M001 | Email transmission | /logs/sendMail.log | 15 min. |
| M001 | File export | /logs/fileExport.log | 15 min. |
| M002 | Data aggregation | /logs/dataAggregate.log | 15 min. |
| M002 | Email transmission | /logs/sendMail.log | 15 min. |
| ... | ... | ... | ... |

Table B is a log monitoring condition table. This table includes a column storing an agent ID for uniquely identifying each monitoring agent application 300. This table includes a column storing an application name to be monitored by the monitoring agent application 300. This table includes a column storing a log file path to be monitored by the monitoring agent application 300. This table includes a column storing an update stopping time, which indicates how long a log file has not been updated to determine that the monitoring agent application 300 is abnormal.

TABLE C

| Scaling ID | Process | Email Address |
|---|---|---|
| A001 | Email notification | admin@co.jp |
| A002 | Server deletion | |
| ... | ... | ... |

Table C is a process management table. This table includes a column storing a scaling ID for uniquely identifying an autoscaling setting. This table includes a column storing a process to be executed by the monitoring server application 320 in the system management server 108. This table includes a column storing an email address indicating a notification destination in a case where the process to be executed is an email notification process. The process management table manages the type of process to be executed in a case where a log of an application operating on a message execution server 107 associated with an autoscaling setting indicated by each scaling ID is stopped. This process of the monitoring server application 320 in the system management server 108 will be described below with reference to FIG. 7.

TABLE D

| Scaling ID | Server ID | Application Name | Message ID |
|---|---|---|---|
| A001 | S001 | Data aggregation | 1000001 |
| A001 | S002 | Data aggregation | 1000001 |
| A002 | S009 | File export | 200003 |
| ... | ... | ... | ... |

Table D is a message management table. This table includes a column storing a scaling ID for uniquely identifying an autoscaling setting. This table includes a column storing a server ID for uniquely identifying a server such as each message execution server 107. This table includes a column storing the application name of an application for which the output of a log is stopped. This table includes a column storing a message ID, which is identification information of a message processed when the output of the log is stopped. Based on the message management table, it is understood which message is processed when the output of a log is stopped.

<Tables Managed by Autoscaling Management Server>

Tables E and F are examples of the tables managed by the autoscaling management server 109 and are saved in the data storage unit 354 of the autoscaling management server 109.

TABLE E

| Monitoring condition ID | Scaling ID | Monitoring item | Threshold for measured value | Number of times of continuation | Threshold for number of times |
|---|---|---|---|---|---|
| C001 | A001 | CPU usage rate | 80 | 1 | 3 |
| C002 | A002 | CPU usage rate | 90 | 0 | 3 |
| ... | ... | ... | ... | ... | ... |

Table E is a resource monitoring condition table. The resource monitoring condition table stores a resource to be monitored by the resource monitoring unit 351 of the autoscaling management application 350, and the result of monitoring the resource. This table includes a column storing a monitoring condition ID for uniquely identifying a resource monitoring condition. This table includes a column storing a scaling ID for uniquely identifying an autoscaling setting. This table includes a column storing a monitoring item, which indicates an item to be monitored. This table includes a column storing a threshold for a measured value, which indicates whether a measured value requires the execution of autoscaling. This table includes a column storing the number of times of continuation, which indicates how many times in a row the state where the measured value exceeds the threshold for a measured value is measured as a result of monitoring the item. This table includes a column storing a threshold for the number of times, which indicates the number of times to be reached by the number of times of continuation to perform autoscaling. For example, the first record indicates that the CPU usage rate of a server associated with an autoscaling setting having a scaling ID "A001" is to be monitored. Then, the first record indicates that as a result of periodically monitoring the CPU usage rate, if the state where the CPU usage rate exceeds 80 percent is measured three times in a row, scaling out is performed. Further, the first record indicates that the number of times the state where the measured value exceeds the threshold for a measured value is consecutively measured is once.

TABLE F

| Scaling ID | Minimum Number of Servers | Required Number of Servers | Operating Server | Maximum Number of Servers |
|---|---|---|---|---|
| A001 | 2 | 2 | S001, S002 | 4 |
| A002 | 2 | 3 | S009, S010, S011 | 4 |
| ... | ... | ... | ... | ... |

Table F is an autoscaling setting management table. In the autoscaling setting management table, a single record represents a single autoscaling setting. This table indicates the number of servers to be managed by the autoscaling management unit 352 of the autoscaling management application 350. The autoscaling setting management table includes a column storing a scaling ID for uniquely identifying an autoscaling setting. This table includes a column storing the minimum number of servers, which indicates at least how many servers associated with the autoscaling setting are to be operating. This table includes a column storing the number of servers, which indicates how many servers associated with the autoscaling setting are currently required. This table includes a column storing an operating server, which indicates the server ID of a currently operating server. A server stored in the column of the operating server is an autoscaling target. This table includes a column storing the maximum number of servers, which indicates at most how many servers can be associated with the autoscaling setting. If a condition indicated in the resource monitoring condition table described above with reference to table E is satisfied, the required number of servers increases or decreases. Consequently, the autoscaling management unit 352 deletes a server or starts a new server. Thus, the number of server IDs stored in the column of the operating server also increases or decreases.

<Message Execution Process>

Figure 4:
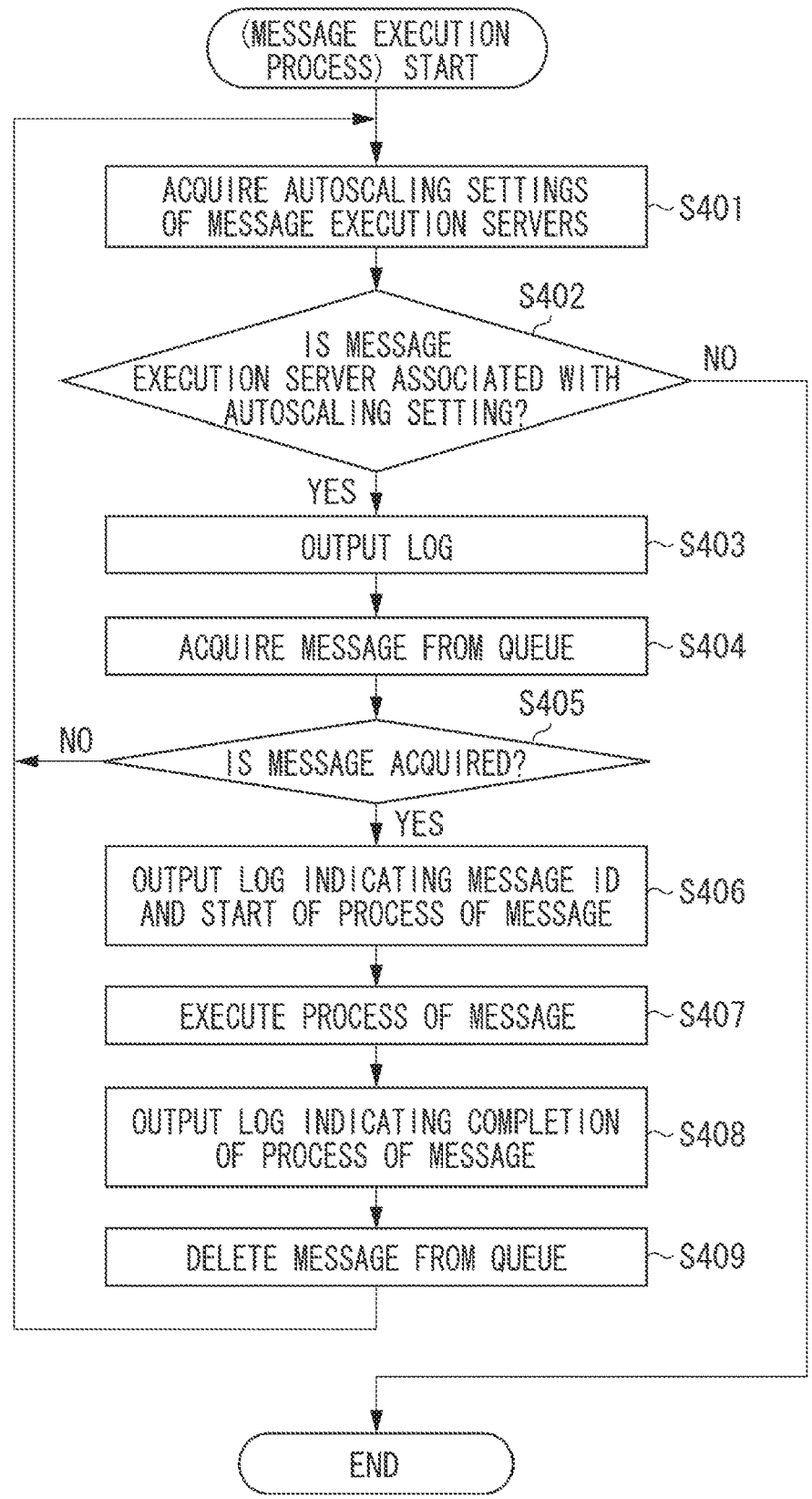
FIG. 4 is a flowchart illustrating an example of a procedure of a message execution process.

FIG. 4 is a flowchart illustrating an example of the procedure of a message execution process executed by each message execution application 310 in each message execution server 107. This process is a process to be executed when the message execution application 310 in the message execution server 107 confirms messages registered in the queues 106, and there is a message that can be acquired.

In step S401, the autoscaling confirmation unit 314 acquires, from the autoscaling management application 350 in the autoscaling management server 109, autoscaling settings with which the message execution servers 107 are associated. Then, the processing proceeds to step S402.

In step S402, the autoscaling confirmation unit 314 confirms each autoscaling setting acquired in step S401 and determines whether the message execution server 107 on which the message execution application 310 operates is associated with the autoscaling setting. If the message execution server 107 is associated with the autoscaling setting (Yes in step S402), the processing proceeds to step S403. If the message execution server 107 is not associated with the autoscaling setting (No in step S402), it is determined that the message execution server 107 is in the state where the message execution server 107 is to be stopped. Then, the message acquisition unit 311 does not acquire a message from any of the queues 106, and the processing of this flowchart ends. If the processing ends, a log is not output. As a result, the monitoring agent application 300 determines that a log is stopped. Then, the monitoring server application 320 in the system management server 108 informs the monitoring agent application 300 that the process of the message execution application 310 is stopped. The process of the monitoring server application 320 in the system management server 108 will be described below with reference to FIG. 7.

In step S403, the message acquisition unit 311 outputs, to a database (not illustrated), a log indicating that one message is to be acquired from the queues 106. Then, the processing proceeds to step S404.

In step S404, the message acquisition unit 311 acquires a single message from one of the queues 106, and the processing proceeds to step S405. In step S405, the message acquisition unit 311 confirms whether a message is acquired in step S404. If a message is acquired (Yes in step S405), the processing proceeds to step S406. If a message is not acquired (No in step S405), the processing returns to step S401.

In the present exemplary embodiment, before a message is acquired, the processes of steps S401 and S402 are executed without exception. Alternatively, in view of the load of the autoscaling management server 109, every predetermined number of times a message is acquired, the processes of steps S401 and S402 may be executed. Further, similarly, in the present exemplary embodiment, before a message is acquired, a log is output in step S403 without exception. Alternatively, in view of the size of a log file, every predetermined number of times a message is acquired, the process of step S403 may be executed.

In step S406, the message execution unit 312 outputs a log including identification information of the acquired message and indicating the start of the process of the message, and the processing proceeds to step S407. The output log will be described below with reference to FIG. 5.

In step S407, the message execution unit 312 executes the process that the message execution unit 312 is instructed to execute by the message acquired in step S404, and the processing proceeds to step S408. The message execution unit 312 periodically outputs a log also while executing the process of the message. As described above, a plurality of message execution applications 310 operate on the message execution server 107. Thus, the process to be executed in step S407 varies. For example, one of the message execution applications 310 performs a data aggregation process, and another one of the message execution applications 310 transmits email. In the present exemplary embodiment, before a message is acquired, it is confirmed whether the message execution server 107 is associated with an autoscaling setting. Further, the configuration may be such that also while the process of the message is executed in step S407, the processes of steps S401 and S402 are periodically performed. If the message execution server 107 is not associated with an autoscaling setting, the process is suspended, a message is registered again, and the process is ended. In this manner, even if a time-consuming process such as a data aggregation process is executed, it is possible to immediately confirm that the message execution server 107 is in the state where the message execution server 107 is to be stopped. Thus, it is possible to bring the message execution server 107 into a stopped state more quickly.

In step S408, the message execution unit 312 outputs a log indicating the completion of the process of the message, and the processing proceeds to step S409. In step S409, the message deletion unit 313 deletes from the queue 106 the message acquired in step S404, and the processing returns to step S401.

<Log of Message Execution Application>

FIG. 5 is a diagram illustrating an example of a log file in the database. A log file 500 includes logs output from the message execution application 310 that processes a message for data aggregation. The database may be included in the message execution server 107 or on the network.

Logs 501 and 502 are logs output in the process of step S403 in the flowchart illustrated in FIG. 4. A log 503 is a log output in the process of step S406 and indicates that the process of a message having a message ID "1000003" is started. A log 504 indicates a log output while the process of the message is executed in step S407. A log 505 is a log output in the process of step S408 and indicates that the process of the message is completed. In the present exemplary embodiment, the message ID is not output in the log 505. Alternatively, the configuration may be such that the message ID is output in the log 505. If a situation such as a deadlock occurs during the process of the message, the log 505 is not output after the log 503 is output. Thus, based on the message ID included in the log 503, it is possible to specify the message in which the situation has occurred during the process of the message.

<Log Monitoring Process>

Figure 6:
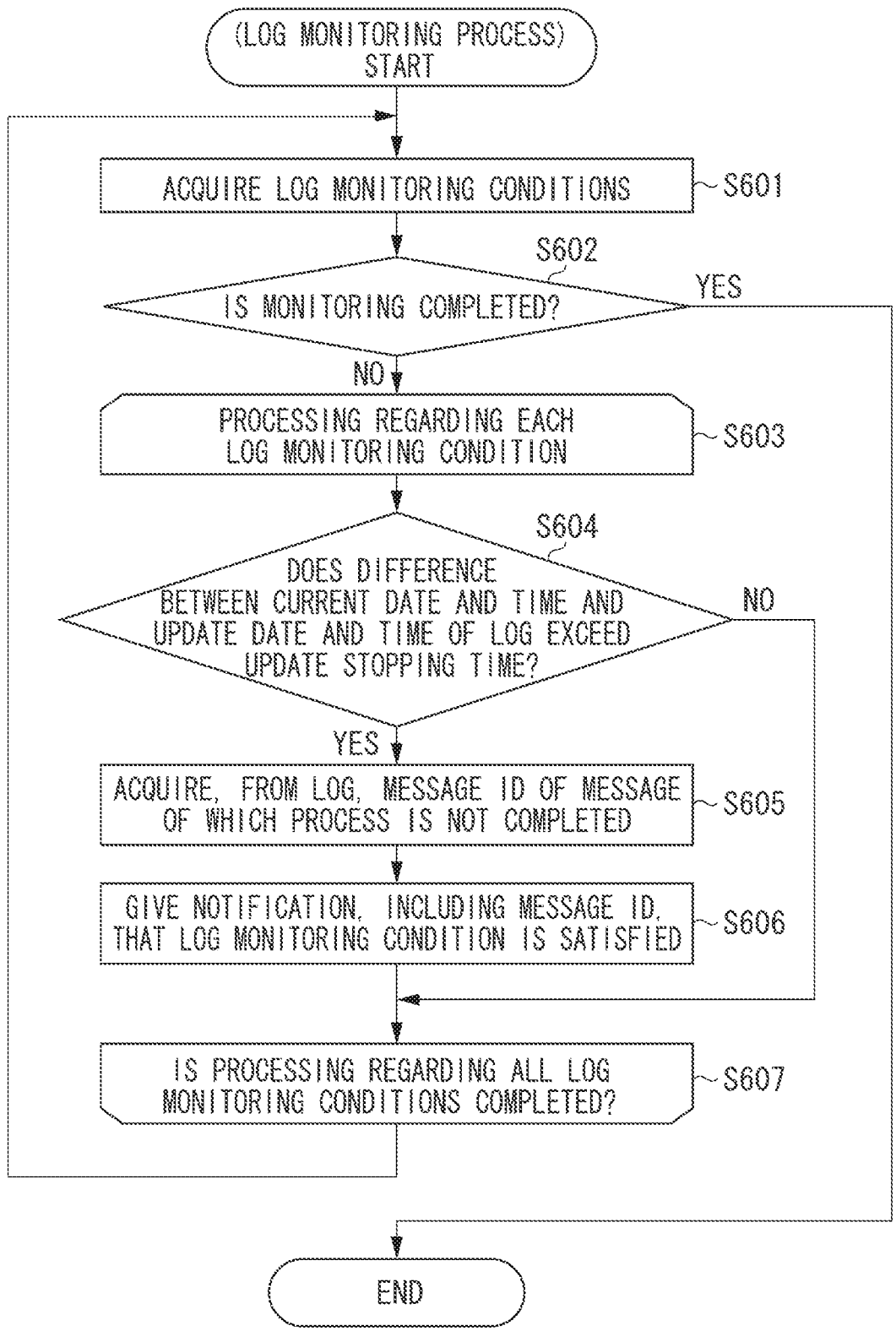
FIG. 6 is a flowchart illustrating an example of a procedure of a log monitoring process.

FIG. 6 is a flowchart illustrating an example of the procedure of a log monitoring process executed by the monitoring agent application 300 in each message execution server 107. This process is a process in which the monitoring agent application 300 of the message execution server 107 monitors a log according to a log monitoring condition.

In step S601, the log monitoring unit 301 acquires log monitoring conditions for the monitoring agent application 300 from the monitoring server application 320 in the system management server 108, and the processing proceeds to step S602. Based on an agent ID included in a request from the log monitoring unit 301, the monitoring server application 320 in the system management server 108 acquires log monitoring conditions from the log monitoring condition table described with reference to table B and transmits the log monitoring conditions to the log monitoring unit 301.

In step S602, the log monitoring unit 301 determines whether the acquired monitoring conditions indicate the completion of monitoring. If the acquired monitoring conditions indicate the completion of monitoring (Yes in step S602), the processing ends. If the acquired monitoring conditions do not indicate the completion of monitoring (No in step S602), the processing proceeds to step S603.

Step S603 represents the start of repetitive processing, and step S607 represents the end of the repetitive processing. When the processing proceeds to step S607, and if the processes of steps S604 to S606 are executed as many times as the number of the acquired log monitoring conditions, the processing returns to step S601.

In step S604, the log monitoring unit 301 determines whether the difference between the current date and time and the update date and time of a log file (e.g., the log file 500) in the log file path included in each log monitoring condition exceeds a reference time (a predetermined time) included in the log monitoring condition. If the difference exceeds the predetermined time (Yes in step S604), the log monitoring unit 301 determines that an abnormality occurs. Then, the processing proceeds to step S605. If the difference does not exceed the predetermined time (No in step S604), the processing proceeds to step S607.

In step S605, the log monitoring unit 301 acquires from the log file the message ID of a message of which the process is not completed. Then, the processing proceeds to step S606. As described above, a message of which the process is not completed is determined based on the fact that the log 503 is output, and the log 505 is not output.

In step S606, the notification unit 302 notifies the monitoring server application 320 in the system management server 108 that an abnormality occurs in the message execution application 310 in which an abnormality is detected in step S604. Then, the processing proceeds to step S607. The notification in step S606 includes the message ID acquired in step S605.

<Abnormality Notification Reception Process>

Figure 7:
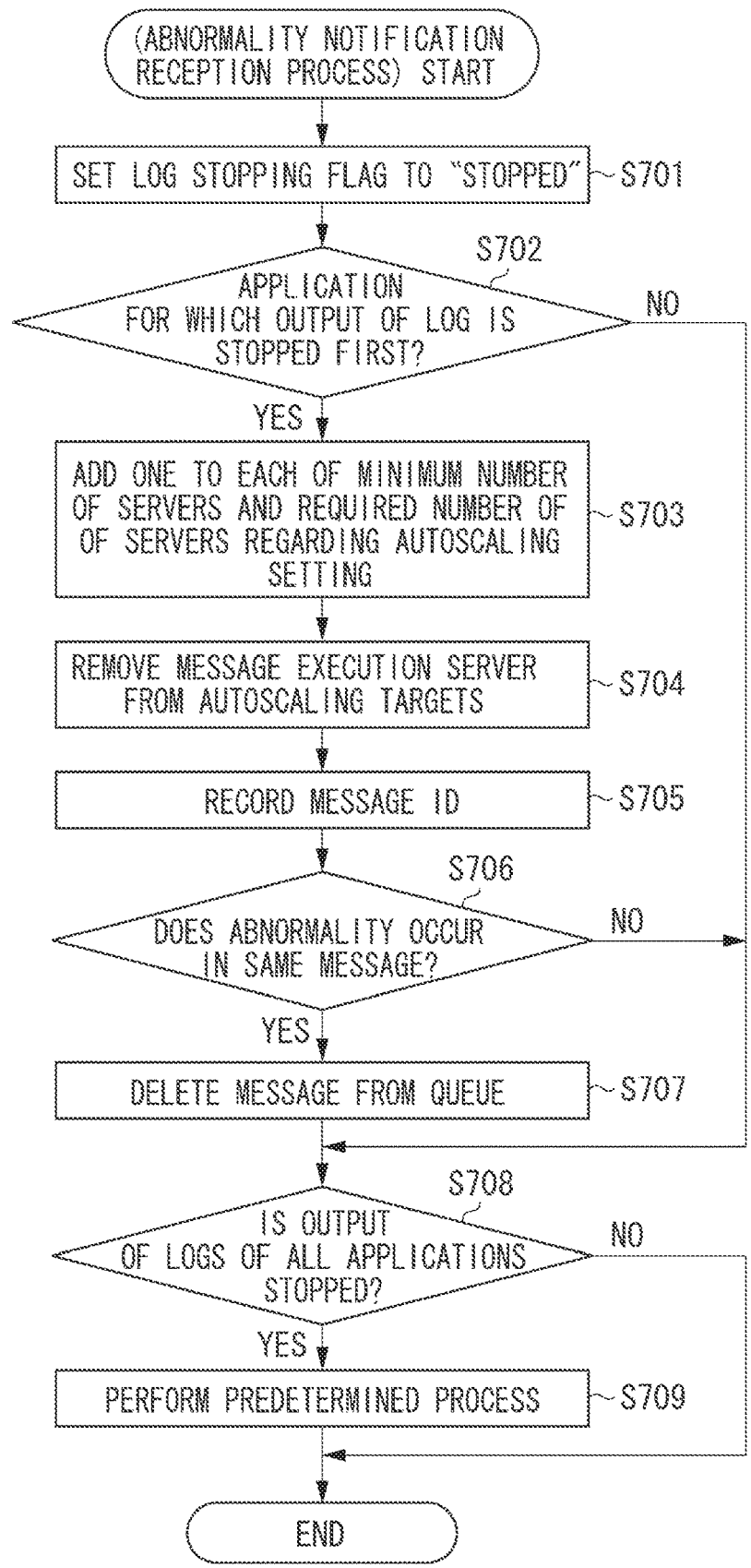
FIG. 7 is a flowchart illustrating an example of a procedure of an abnormality notification reception process.

FIG. 7 is a flowchart illustrating an example of the procedure of an abnormality notification reception process executed by the monitoring server application 320 in the system management server 108. This process is a process to be executed when the monitoring server application 320 receives a notification from the monitoring agent application 300 of the message execution server 107 in the process of step S606.

In step S701, the server management unit 321 changes the column of the log state in the server management table (table A) to "stopped", and the processing proceeds to step S702. At this time, the column of the log state is changed to "stopped" in a record of an application for which the update of a log is stopped regarding the message execution server 107 on which the monitoring agent application 300 having notified the monitoring server application 320 of an abnormality operates.

In step S702, the server management unit 321 confirms the server management table and determines whether this application is an application for which the output of a log is stopped first among the message execution applications 310 operating on the message execution server 107 from which the monitoring server application 320 has received the notification. If the application is a message execution application 310 for which the output of a log is stopped first (Yes in step S702), the processing proceeds to step S703. If the application is not a message execution application 310 for which the output of a log is stopped first (No in step S702), the processing proceeds to step S708.

In step S703, the process execution unit 322 adds one to each of the minimum number of servers and the required number of servers regarding an autoscaling setting associated with the message execution server 107 on which the message execution application 310 for which the output of a log is stopped operates. Then, the processing proceeds to step S704. Specifically, the process execution unit 322 requests the autoscaling management application 350 in the autoscaling management server 109 to add one to each of the minimum number of servers and the required number of servers regarding the autoscaling setting. The process execution unit 322 receives a response indicating completion from the autoscaling management application 350 in the autoscaling management server 109, and the processing proceeds to step S704.

In step S704, the process execution unit 322 removes from autoscaling targets the message execution server 107 on which the message execution application 310 for which the output of a log is stopped operates. Then, the processing proceeds to step S705. Specifically, the process execution unit 322 requests the autoscaling management application 350 in the autoscaling management server 109 to remove the message execution server 107, including the server ID of the message execution server 107, from autoscaling targets. This request also includes a request to decrease the minimum number of servers by one. The process execution unit 322 receives a response indicating completion from the autoscaling management application 350 in the autoscaling management server 109, and the processing proceeds to step S705.

Before the message execution server 107 on which the message execution application 310 for which the output of a log is stopped operates is removed from autoscaling targets in the process of step S704, in step S703, the autoscaling setting is changed to add one message execution server 107. If the message execution server 107 is removed from autoscaling targets, the autoscaling management application 350 in the autoscaling management server 109 newly starts a message execution server 107 to maintain the minimum number of servers. However, it takes some time until this start is completed. Thus, meanwhile, the information processing system 101 that is operating will process messages in the state where there is one less message execution server 107. Thus, each of the minimum number of servers and the required number of servers is increased by one in advance in the process of step S703, whereby it is possible to avoid influencing the information processing system 101 that is operating. In the present exemplary embodiment, the process of step S703 is performed without exception. Alternatively, the configuration may be such that, for example, the number of messages in the queues 106 is confirmed, and only if the number of messages is a threshold or more, the process of step S703 is executed.

In step S705, the server management unit 321 stores in the message management table a message ID included in the received notification, and the processing proceeds to step S706. In step S706, the server management unit 321 determines whether the message ID included in the received notification is redundant in the message management table. If the message ID is redundant (Yes in step S706), the processing proceeds to step S707. If the message ID is not redundant (No in step S706), the processing proceeds to step S708.

In step S707, the process execution unit 322 deletes from one of the queues 106 a message having the message ID included in the received notification, and the processing proceeds to step S708. As described above, if the invisibility time of the message elapses, the message execution applications 310 of the other message execution servers 107 can acquire the same message from the queue 106. If a situation such as a deadlock is caused by the content of the message, the output of logs of the message execution applications 310 of the other message execution servers 107 are also stopped, and the situation continues to occur repeatedly. Thus, the message is deleted in the process of step S707, whereby it is possible to prevent the situation from continuing to occur repeatedly.

In step S708, the server management unit 321 references the server management table (table A) and determines whether the output of logs of all the message execution applications 310 of the message execution server 107 is stopped. If the output of logs of all the message execution applications 310 of the message execution server 107 is stopped (Yes in step S708), the server management unit 321 determines that the message execution server 107 enters a stopped state. Then, the processing proceeds to step S709. That is, at this time, it is confirmed whether all the message execution applications 310 stop acquiring messages, and a process based on a message acquired before the setting is changed in step S701 is completed. If the output of logs of all the message execution applications 310 of the message execution server 107 is not stopped (No in step S708), the processing ends.

In step S709, the process execution unit 322 references the process management table (table C), and executes and ends a predetermined process. In step S709, as the predetermined process, a plurality of processes may be executed. As the predetermined process, a process specified by, in the process management table, the scaling ID of the autoscaling setting associated with the message execution server 107 in the stopped state is executed.

In step S708, the server management unit 321 may confirm logs indicating that processes by applications other than the application in which an abnormality has occurred are completed. Then, the processing may proceed to step S709.

As described above, in the present exemplary embodiment, in a case where an abnormality occurs in any of message execution applications in a message execution server, a system management server excludes the message execution server from autoscaling targets. When it is confirmed that the message execution server is excluded from autoscaling targets, the message execution server stops acquiring a message from a queue. According to the present exemplary embodiment, a message execution server ceases to acquire a message from a queue. Thus, it is possible to delete the message execution server or investigate the cause of an abnormality.

A second exemplary embodiment is described below. In the first exemplary embodiment, the monitoring agent application 300 is placed in each message execution server 107, and a log file is monitored. In the second exemplary embodiment, an example is described where the monitoring agent application 300 is not placed in each message execution server 107. In the second exemplary embodiment, only portions different from those of the first exemplary embodiment are described.

<System Configuration>

Figure 8:
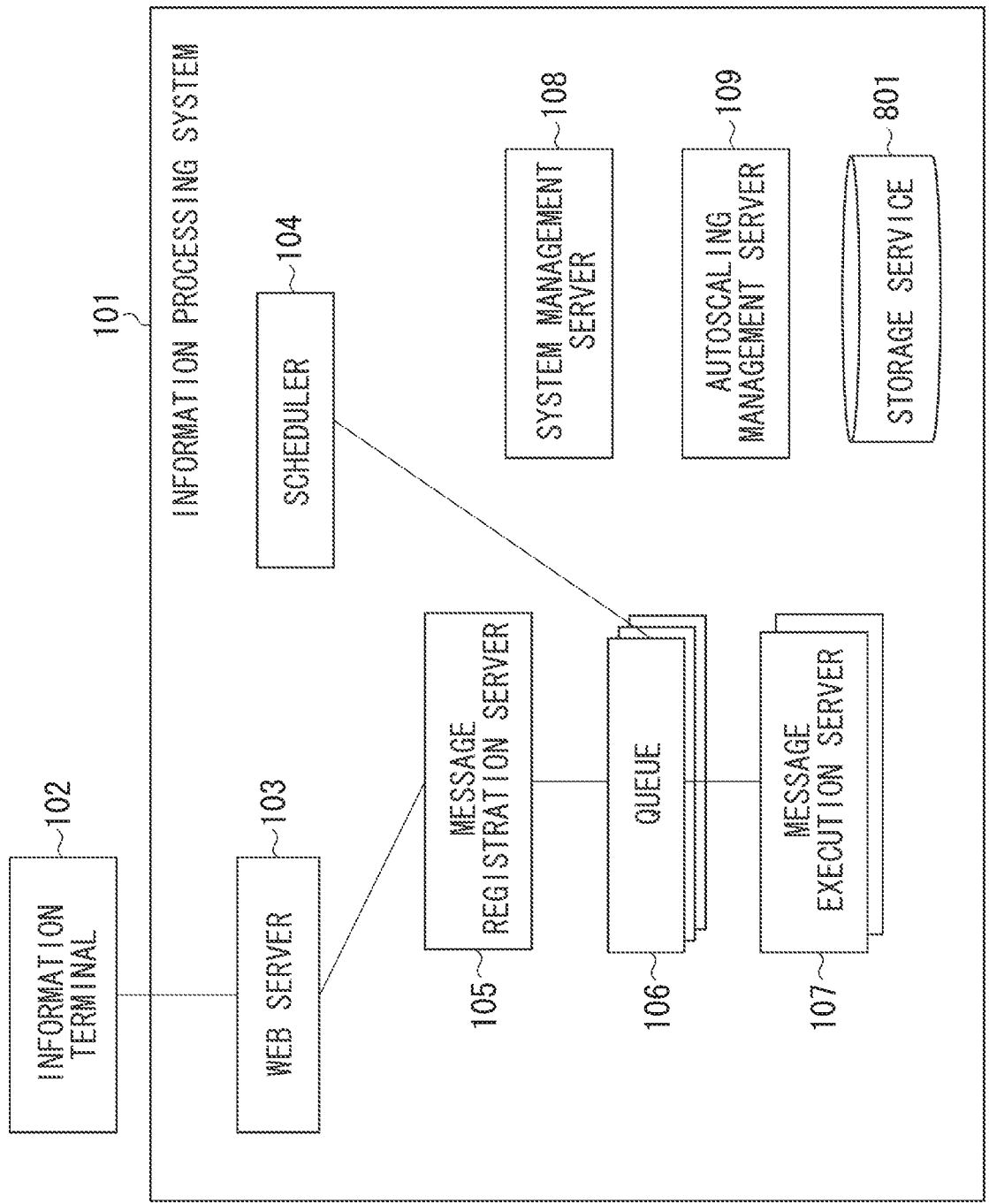
FIG. 8 is a schematic diagram illustrating an overall configuration of a system according to a second exemplary embodiment.

FIG. 8 is a schematic diagram illustrating the overall configuration of a system according to the second exemplary embodiment.

FIG. 8 is different from FIG. 1 in that a storage service 801 is added. The storage service 801 is a service for managing a file. The storage service 801 has the functions of creating and deleting a directory, and the functions of registering, acquiring, and deleting a file. In the present exemplary embodiment, the storage service 801 stores log files of the message execution applications 310. The log files stored in the storage service 801 are configured to be accessible by the system management server 108 and the message execution servers 107.

<Functional Configuration of Message Execution Server>

FIG. 9A is a diagram illustrating an example of the functional configuration of each message execution server 107 according to the second exemplary embodiment. FIG. 9A is different from FIG. 3A in that the monitoring agent application 300 is not included.

<Functional Configuration of System Management Server>

FIG. 9B is a diagram illustrating an example of the functional configuration of the system management server 108 according to the second exemplary embodiment. FIG. 9B is different from FIG. 3B in that a log monitoring unit 901 is added.

The log monitoring unit 901 is a module for acquiring a log monitoring condition from a log monitoring condition table described below with reference to table G (described below) and monitoring a log to determine whether the log satisfies the log monitoring condition.

<Table Managed by System Management Server>

Among the tables managed by the system management server 108, a log monitoring condition table is different from that according to the first exemplary embodiment.

TABLE G

| Server ID | Application Name | Log File Path | Update Stopping Time |
|---|---|---|---|
| S001 | Data aggregation | https://storage.com/logs/dataAggr egate.log | 15 min. |
| S001 | Email transmission | https://storage.com/logs/sendMail .log | 15 min. |
| S001 | File export | https://storage.com/logs/fileExpo rt.log | 15 min. |
| S002 | Data aggregation | https://storage.com/logs/dataAggr egate.log | 15 min. |
| S002 | Email transmission | https://storage.com/logs/sendMail .log | 15 min. |

Table G is a log monitoring condition table according to the second exemplary embodiment. Table G is different from table B, which is the log monitoring table according to the first exemplary embodiment, in that the column of the agent ID is changed to the column of a server ID. Further, the second exemplary embodiment is different from the first exemplary embodiment in that the file path of a log stored in the log file path is the storage service 801. The log monitoring unit 901 of the system management server 108 monitors a log file of each message execution application 310 in each message execution server 107 stored in the storage service 801, which is specified in this table. In the present exemplary embodiment, the log monitoring unit 901 of the system management server 108 is configured to monitor not a log file saved in the message execution server 107, but a log file stored in the storage service 801. To externally monitor a log file saved in the message execution server 107, the process of logging into the message execution server 107 is required. This means that the system management server 108 is to manage login information of each message execution server 107. Further, in one embodiment, it may be necessary to log into the message execution server 107 that is operating and providing a service for a customer. Thus, in the present exemplary embodiment, the configuration is such that a log file is stored in a storage service accessible by both the system management server 108 and the message execution server 107.

<Message Execution Process>

A message execution process according to the second exemplary embodiment is different from that according to the first exemplary embodiment only in that the output destinations of the logs in steps S403, S406, S407, and S408 are the storage service 801. In the present exemplary embodiment, the output destinations of the logs are the storage service 801. Alternatively, the configuration may be such that, for example, a log is output to a log file of the message execution server 107, and the log file is synchronized with the storage service 801.

<Log Monitoring Process>

Figure 10:
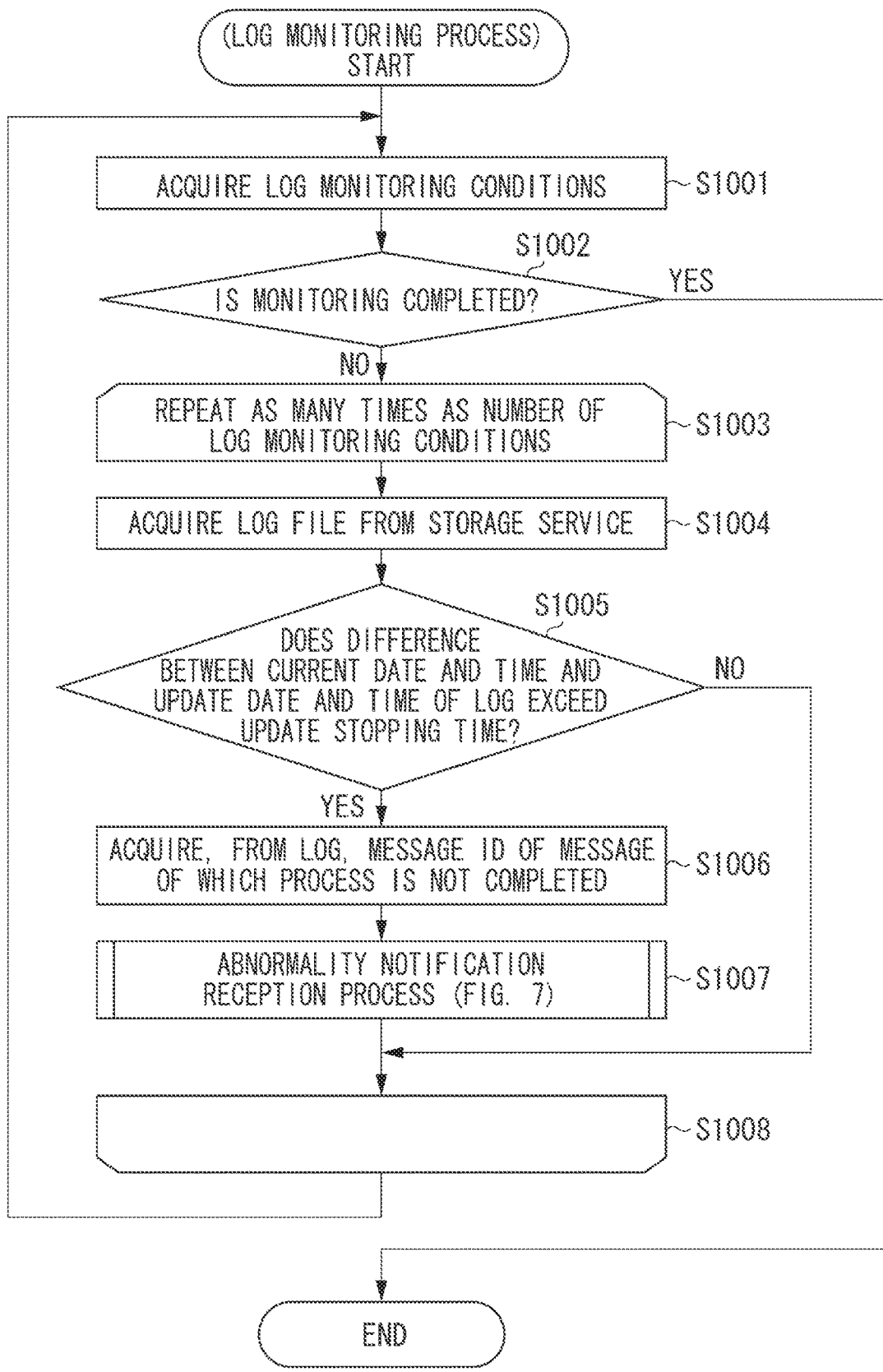
FIG. 10 is a flowchart illustrating an example of a procedure of a log monitoring process according to the second exemplary embodiment.

FIG. 10 is a flowchart illustrating an example of the procedure of a log monitoring process according to the second exemplary embodiment executed by the monitoring server application 320 in the system management server 108. In the first exemplary embodiment, the log monitoring process is executed by the monitoring agent application 300. In the second exemplary embodiment, the log monitoring process is executed by the monitoring server application 320 in the system management server 108.

In step S1001, the log monitoring unit 901 acquires all log monitoring conditions from the log monitoring condition table described with reference to table G, and the processing proceeds to step S1002. In the first exemplary embodiment, the monitoring agent application 300 monitors only log monitoring conditions for the message execution server 107 on which the monitoring agent application 300 operates. In the second exemplary embodiment, however, the monitoring server application 320 in the system management server 108 monitors log monitoring conditions for all the message execution servers 107.

In step S1002, the log monitoring unit 901 determines whether the acquired monitoring conditions indicate the completion of monitoring. If the acquired monitoring conditions indicate the completion of monitoring (Yes in step S1002), the processing ends. If the acquired monitoring conditions do not indicate the completion of monitoring (No in step S1002), the processing proceeds to step S1003. Step S1003 represents the start of repetitive processing, and step S1008 represents the end of the repetitive processing. When the processing proceeds to step S1008, and if the processes of steps S1004 to S1007 are executed as many times as the number of the acquired log monitoring conditions, the processing returns to step S1001.

In step S1004, the log monitoring unit 901 acquires from the storage service 801 a log file in the log file path included in each log monitoring condition, and the processing proceeds to step S1005. In step S1005, the log monitoring unit 901 determines whether the difference between the current date and time and the update date and time of the log file acquired in step S1004 exceeds the update stopping time included in the log monitoring condition. If the difference exceeds the update stopping time (Yes in step S1005), the log monitoring unit 901 determines that an abnormality occurs. Then, the processing proceeds to step S1006. If the difference does not exceed the update stopping time (No in step S1005), the processing proceeds to step S1008.

In step S1006, the log monitoring unit 901 acquires from the log file the message ID of a message of which the process is not completed. Then, the processing proceeds to step S1006. As described above, a message of which the process is not completed is determined based on the fact that the log 503 is output, and the log 505 is not output.

In step S1007, the abnormality notification reception process described with reference to FIG. 7 is executed, and the processing proceeds to step S1008.

As described above, in the present exemplary embodiment, the system management server 108 monitors a log file of each message execution application 310 in each message execution server 107 stored in the storage service 801. Based on the result of monitoring the log file, the system management server 108 can stop the process of the message execution application 310.

A third exemplary embodiment is described below. In the first and second exemplary embodiments, it is determined whether each message execution server 107 is in the state where the message execution server 107 is to be stopped, based on whether the message execution server 107 is an autoscaling target. In the third exemplary embodiment, an example is described where the system management server 108 sends a command, thereby determining that the message execution server 107 is in the state where the message execution server 107 is to be stopped. Portions similar to those of the first and second exemplary embodiments are not described here.

<System Configuration>

The overall configuration of a system according to the third exemplary embodiment is similar to that according to the second exemplary embodiment and is the configuration illustrated in FIG. 8.

<Functional Configuration of Message Execution Server>

Figure 11A:
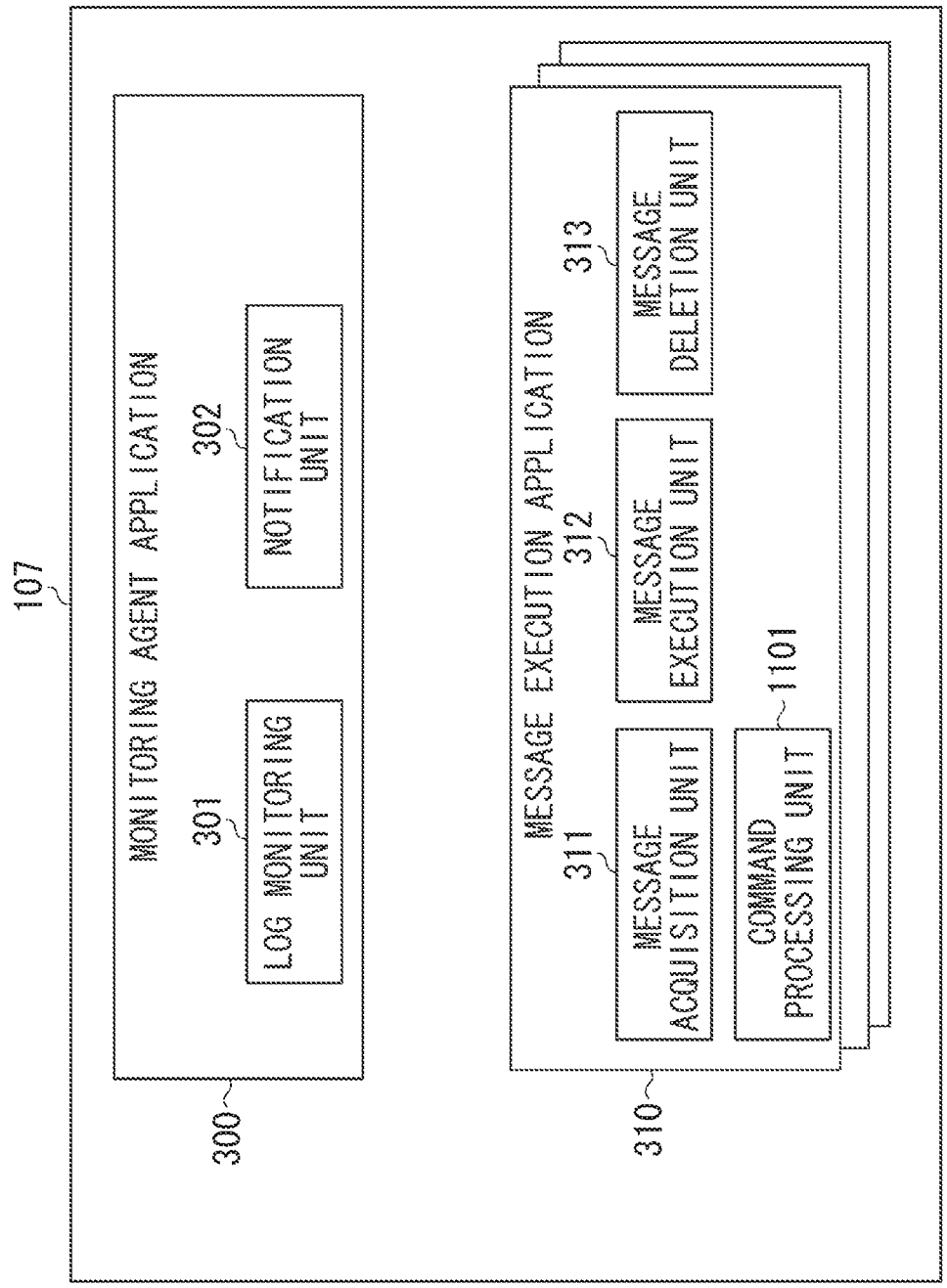
FIGS. 11A and 11B are diagrams illustrating examples of functional configurations of servers according to a third exemplary embodiment.

FIG. 11A is a diagram illustrating an example of the functional configuration of each message execution server 107 according to the third exemplary embodiment. FIG. 11A is different from FIG. 3A in that the autoscaling confirmation unit 314 of each message execution application 310 is not included, and a command processing unit 1101 is added.

The command processing unit 1101 is a module for periodically acquiring and analyzing a command stored in the storage service 801.

<Functional Configuration of System Management Server>

Figure 11B:
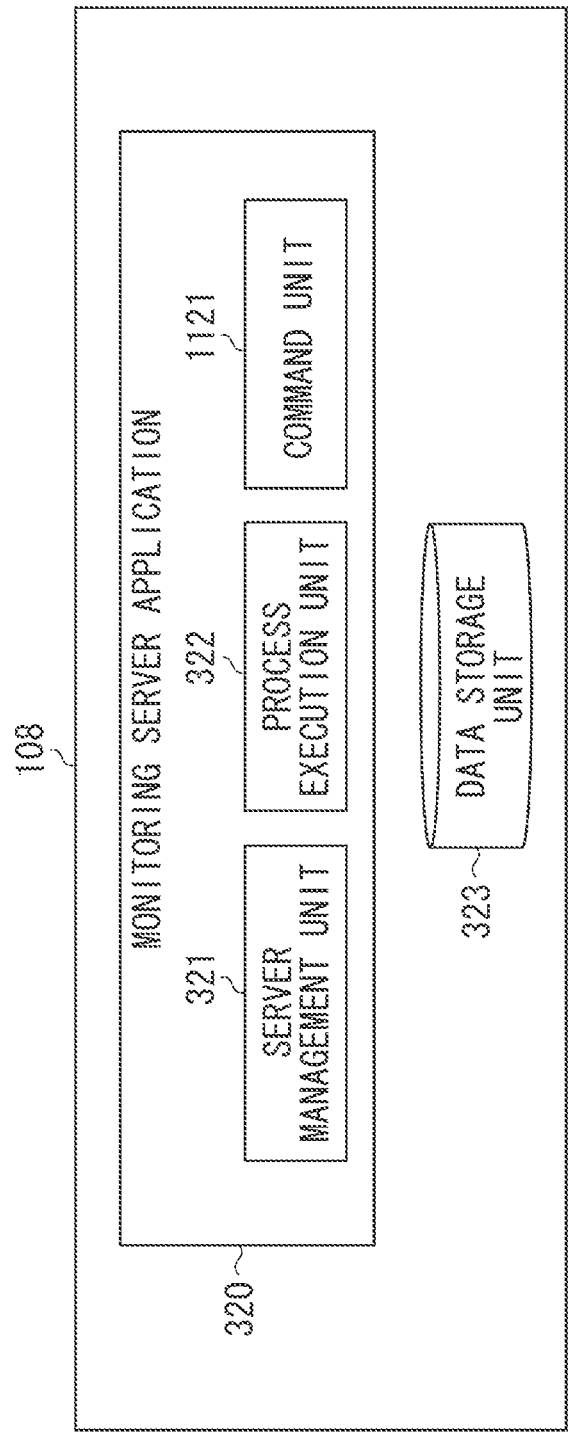

FIG. 11B is a diagram illustrating an example of the functional configuration of the system management server 108 according to the third exemplary embodiment. FIG. 11B is different from FIG. 3B in that a command unit 1121 is added.

The command unit 1121 is a module for storing in the storage service 801 a stop command for stopping the process of the message execution application 310. Further, the command unit 1121 periodically confirms with the storage service 801 whether a completion result file of the command is stored in the storage service 801. Then, the command unit 1121 acquires the completion result file of the command.

<Table Managed by System Management Server>

Among the tables managed by the system management server 108, a server management table is different from that according to the first exemplary embodiment.

TABLE H

| Scaling ID | Server ID | Application Name | Processing Mode |
|---|---|---|---|
| A001 | S001 | Data aggregation | Abnormal |
| A001 | S001 | Email transmission | Stopped |
| A001 | S001 | File export | Executed |
| A001 | S002 | Data aggregation | Executed |
| A001 | S002 | Email transmission | Executed |
| ... | ... | ... | ... |

Table H is a server management table according to the third exemplary embodiment. Table H is different from table A, which is the server management table according to the first exemplary embodiment, in that the column of the log state is changed to the column of a processing mode. The processing mode represents a processing mode in which each message execution application 310 operates. If the processing mode is "executed", it is indicated that the message is normally processed. If the processing mode is "stopped", it is indicated that a command from the monitoring server application 320 in the system management server 108 is received, and the process of the message is stopped. If the processing mode is "abnormal", it is indicated that the process of the message cannot be performed for some reason, such as a case where a situation such as a deadlock occurs.

<Message Execution Process>

Figure 12:
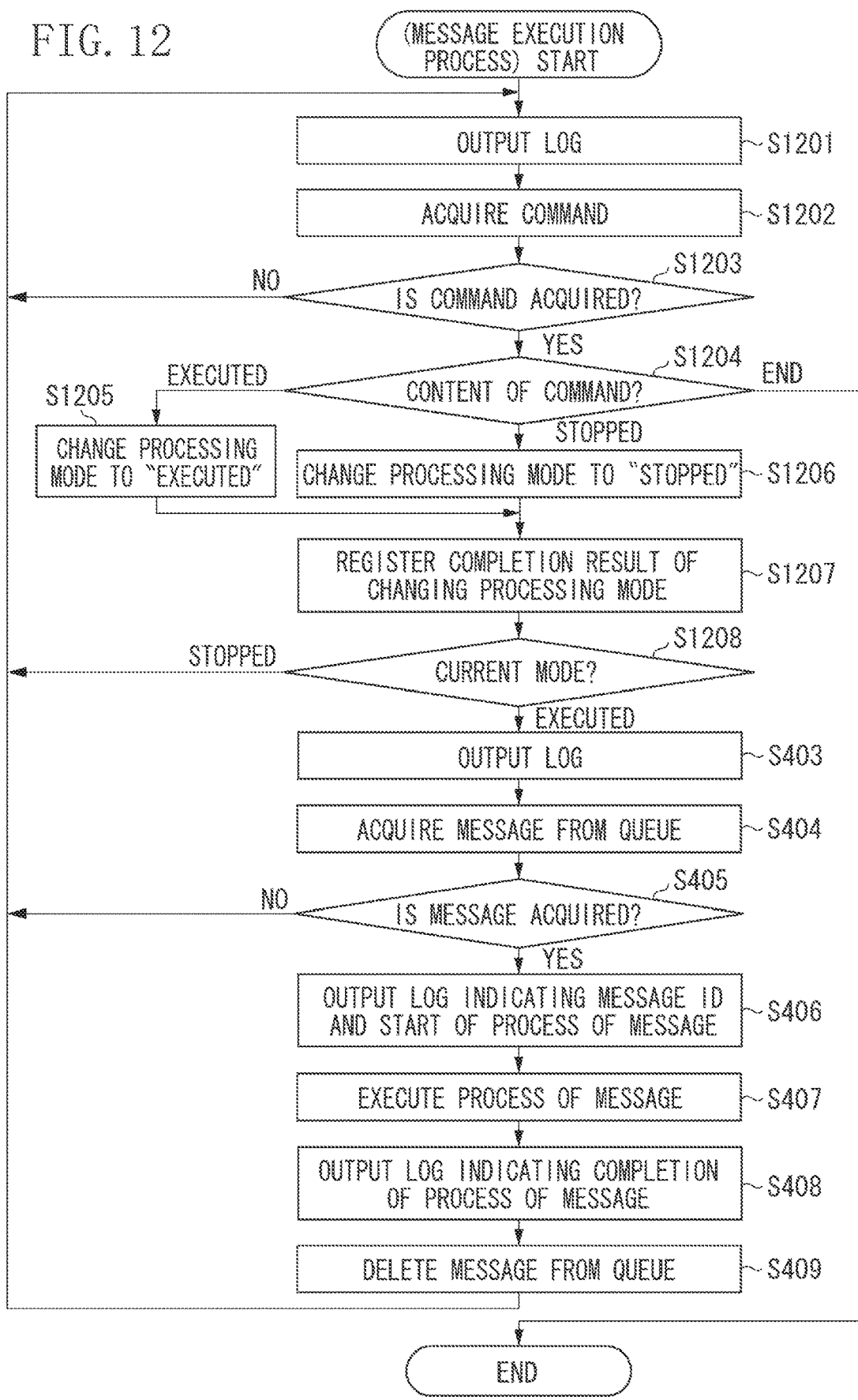
FIG. 12 is a flowchart illustrating an example of a procedure of a message execution process according to the third exemplary embodiment.

FIG. 12 is a flowchart illustrating an example of the procedure of a message execution process according to the third exemplary embodiment executed by each message execution application 310 in each message execution server 107.

In step S1201, the command processing unit 1101 outputs a log indicating that a command is to be acquired from the storage service 801. Then, the processing proceeds to step S1202. In step S1202, the command processing unit 1101 acquires a command from the storage service 801, and the processing proceeds to step S1203.

In step S1203, the command processing unit 1101 confirms whether a command is acquired in step S1202. If a command is acquired (Yes in step S1203), the processing proceeds to step S1204. If a command is not acquired (No in step S1203), the processing returns to step S1201. In step S1201, the command processing unit 1101 continues to monitor a command.

In step S1204, the command processing unit 1101 confirms the content of the command. If the command is a command to change the processing mode to "executed", the processing proceeds to step S1205. If the command is a command to change the processing mode to "stopped", the processing proceeds to step S1206. If the command is a command to end the processing, the processing ends.

In step S1205, the command processing unit 1101 changes the processing mode to "executed", and the processing proceeds to step S1207. In step S1206, the command processing unit 1101 changes the processing mode to "stopped", and the processing proceeds to step S1207. In step S1207, the command processing unit 1101 registers a completion result file of the command in the storage service 801, and the processing proceeds to step S1208.

In step S1208, the message acquisition unit 311 confirms the current processing mode. If the current processing mode is "executed", the processing proceeds to step S403. If the current processing mode is "stopped", the processing returns to step S1201. Steps S403 to S409 are similar to the processes described with reference to FIG. 4, and therefore are not described here.

\<Abnormality Notification Reception Process\>

Figure 13:
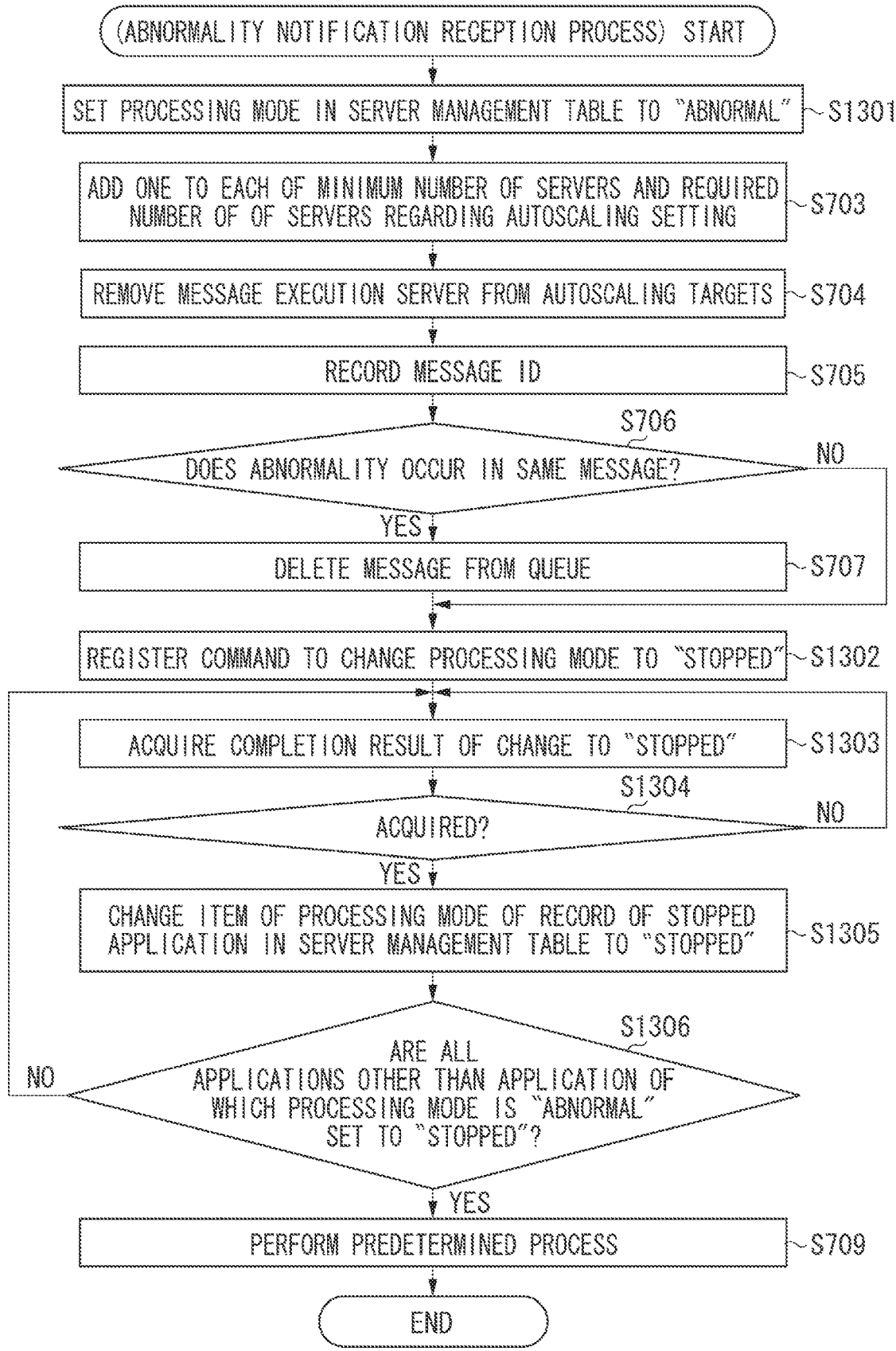
FIG. 13 is a flowchart illustrating an example of a procedure of an abnormality notification reception process according to the third exemplary embodiment.

FIG. 13 is a flowchart illustrating an example of the procedure of an abnormality notification reception process according to the third exemplary embodiment executed by the monitoring server application 320 in the system management server 108.

In step S1301, the server management unit 321 registers the processing mode in the server management table described with reference to Table H, as "abnormal", and the processing proceeds to step S703. The processes of steps S703 to S707 are similar to the processes described with reference to FIG. 7, and therefore are not described here.

In step S1302, the command unit 1121 registers in the storage service 801 a command to change the processing mode of the message execution application 310 in the message execution server 107 to "stopped", and the processing proceeds to step S1303.

In step S1303, the command unit 1121 acquires from the storage service 801 a completion result of the command to the message execution application 310 in the message execution server 107, and the processing proceeds to step S1304. It takes some time for the message execution application 310 in the message execution server 107 to execute the command after the command is registered in step S1302. Thus, the command unit 1121 may wait for a certain period between steps S1302 and S1303. Further, the configuration may be such that the processes up to step S1302 for registering the command, and the processes of step S1303 and thereafter for acquiring the completion result of the command may be executed by different threads.

In step S1304, the command unit 1121 determines whether the completion result of the command is acquired. If one or more completion results are acquired, the processing proceeds to step S1305. If not even a single completion result is acquired, the processing returns to step S1303.

In step S1305, based on the completion result of the command to the message execution application 310 in the message execution server 107 acquired in step S1304, the server management unit 321 changes the processing mode in the server management table described with reference to table H to "stopped", and the processing proceeds to step S1306.

In step S1306, the server management unit 321 references the server management table described with reference to table H and confirms whether all the message execution applications 310 in the message execution server 107 are set to "stopped" or "abnormal". If all the message execution applications 310 in the message execution server 107 are set to "stopped" or "abnormal" (Yes in step S1306), the server management unit 321 determines that the message execution server 107 is in a stopped state. Then, the processing proceeds to step S709. If not all the message execution applications 310 in the message execution server 107 are set to "stopped" or "abnormal" (NO in step S1306), the processing returns to step S1303. The process of step S709 is similar to the process described with reference to FIG. 7, and therefore is not described here.

In the third exemplary embodiment, similarly to the first exemplary embodiment, the configuration is such that the monitoring agent application 300 is placed in each message execution server 107. Alternatively, similarly to the second exemplary embodiment, the configuration may be such that the monitoring agent application 300 is not placed in each message execution server 107, and the log monitoring unit 901 is placed in the monitoring server application 320 in the system management server 108.

As described above, in the present exemplary embodiment, a message execution server acquires a command stored in storage by a system management server. Then, the acquisition of a message from a queue by a message execution application is stopped. According to the present exemplary embodiment, a monitoring server application in the system management server explicitly gives a command, whereby it is possible to stop the process of the message execution application.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-010747, filed Jan. 24, 2017, which is hereby incorporated by reference herein in its entirety.

What is claimed is:

1. An information processing system comprising:
a memory storing instructions related to a management server managing one or more virtual machines, wherein a plurality of applications operate in a first virtual machine included in the one or more virtual machines managed by the management server, and wherein each of the applications performs processes one at a time based on a first setting for the first virtual machine; and
a processor executing the instructions causing a computer in the information processing system to
change, in a case where an abnormality is detected in at least one of the applications operating in the first virtual machine, the first setting for the first virtual machine to a second setting which is different from the first setting,
wherein, the other application(s) in which an abnormality is not detected and which operates in the first virtual machine completes a process having been performed before the change of the setting, wherein, after the other application(s) has completed the process, the other application(s) does not perform, according to the second setting, another process, and Wherein each of the applications:

executes a process based on a message acquired from a message storage area; and outputs one or more logs regarding the process based on the acquired message, and wherein the virtual machine detects, in a case where a log is not output by the application in a predetermined time, an abnormality of the application.

2. The information processing system according to claim 1. wherein the instructions further cause the computer to delete the first virtual machine after all the applications stop, according to the second setting, performing another process.

3. The information processing system according to claim 1, Wherein the instructions further cause the computer to monitor presence or absence of an abnormality in each of the applications.

4. The information processing system according to claim 1, wherein each of the applications outputs a log including identification information of the acquired message.

5. The information processing system according to claim 1, wherein the process executed by each of the applications includes at least one of a data aggregation process, an email transmission process, and a file export. process.

6. The information processing system according to claim 1, wherein in the information processing system, a number of virtual machines for performing processes based on the messages stored in a message storage area is adjusted according to a processing load caused by stored messages, wherein the application operating in the virtual machines as targets of the adjustment acquires a message from the message storage area, and wherein the second setting is a setting for removing the virtual machine from the targets of the adjustment to stop acquisition of a message by each of the applications.

7. The information processing system according to claim 1, wherein one or more applications operating in a second virtual machine included in the virtual machines acquire messages according to the first setting for the second virtual machine, after the first setting for the first virtual machine has been changed to the second setting.

8. The information processing system according to claim 7, wherein each of the applications operating in the first virtual machine and each of the one or more applications operating in the second virtual machine acquire a message from a same message storage area.

9. A control method for a management server managing one or more virtual machines, wherein a plurality of applications operate in a first virtual machine included in the one or more virtual machines managed by the management server, and included in an information processing system, and wherein each of the applications performs processes one at a time based on a first setting for the first virtual machine by the information processing system, the control method comprising:

changing, in a case where an abnormality is detected in at least one of the applications operating in the first virtual machine, the first setting, for the first virtual machine to a second setting which is different from the first setting, wherein, the other application(s) in which an abnormality is not detected and which operates in the first virtual machine completes a process has been performed before the change of the setting, wherein, after the other application(s) has completed the process, the other application(s) does not perform, according to the second setting, another process, and wherein each of the applications:

executes a process based on a message acquired from a message storage area; and outputs one or more logs regarding the process based on the acquired message, and wherein the virtual machine detects, in a case where a log is not output by the application in a predetermined time, an abnormality of the application.

* * * * *